US009258045B2

United States Patent
Kim et al.

(10) Patent No.: US 9,258,045 B2
(45) Date of Patent: Feb. 9, 2016

(54) METHOD FOR EFFICIENTLY TRANSMITTING SIGNAL IN MULTI-ANTENNA WIRELESS COMMUNICATION SYSTEM AND APPARATUS FOR SAME

(71) Applicant: LG ELECTRONICS INC., Seoul (KR)

(72) Inventors: Youngtae Kim, Seoul (KR); Hyukjin Chae, Seoul (KR); Kijun Kim, Seoul (KR); Jonghyun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/765,794

(22) PCT Filed: Feb. 25, 2014

(86) PCT No.: PCT/KR2014/001512
§ 371 (c)(1),
(2) Date: Aug. 4, 2015

(87) PCT Pub. No.: WO2014/129871
PCT Pub. Date: Aug. 28, 2014

(65) Prior Publication Data
US 2015/0372733 A1    Dec. 24, 2015

Related U.S. Application Data

(60) Provisional application No. 61/769,147, filed on Feb. 25, 2013, provisional application No. 61/774,569, filed on Mar. 7, 2013.

(51) Int. Cl.
*H04B 7/02* (2006.01)
*H04B 7/04* (2006.01)
*H04B 7/06* (2006.01)

(52) U.S. Cl.
CPC ............ *H04B 7/0482* (2013.01); *H04B 7/0404* (2013.01); *H04B 7/0626* (2013.01)

(58) Field of Classification Search
None
See application file for complete search history.

(56) References Cited

U.S. PATENT DOCUMENTS

| | | | | |
|---|---|---|---|---|
| 8,885,754 | B2 * | 11/2014 | Kim | H04B 7/0456 375/260 |
| 2007/0097856 | A1 * | 5/2007 | Wang | H04B 7/0417 370/210 |

(Continued)

FOREIGN PATENT DOCUMENTS

| | | |
|---|---|---|
| KR | 10-0750378 | 8/2007 |
| WO | 2012/024059 | 2/2012 |
| WO | 2013/024350 | 2/2013 |

OTHER PUBLICATIONS

PCT International Application No. PCT/KR2014/001512, Written Opinion of the International Searching Authority dated May 27, 2014, 12 pages.

(Continued)

*Primary Examiner* — Daniel Washburn
*Assistant Examiner* — Berhanu Tadese
(74) *Attorney, Agent, or Firm* — Lee, Hong, Degerman, Kang & Waimey

(57) ABSTRACT

The present invention relates to a method for a transmitting end efficiently transmitting a signal in a wireless communication system supporting a multi-antenna and an apparatus for same. More particularly, the method comprises a step of transmitting a downlink signal based on a precoding matrix (W) for an antenna comprising a plurality of antenna elements aligned perpendicularly, wherein the precoding matrix (W) corresponds to a codebook configured so that phase increase is limited with respect to a plurality of precoding vector values populating a same column.

9 Claims, 9 Drawing Sheets

(56) References Cited

U.S. PATENT DOCUMENTS

| | | | | |
|---|---|---|---|---|
| 2008/0181174 A1* | 7/2008 | Cho | ................ | H04B 7/0857 370/329 |
| 2010/0189189 A1* | 7/2010 | Hoshino | ............ | H04B 7/0408 375/267 |
| 2010/0322223 A1* | 12/2010 | Choi | ................ | H04B 7/0452 370/342 |
| 2011/0195662 A1* | 8/2011 | Seo | ................ | H04B 7/024 455/39 |
| 2012/0039251 A1 | 2/2012 | Sayana et al. | | |
| 2012/0099469 A1* | 4/2012 | Luo | ................ | H04B 7/07434 370/252 |
| 2012/0177001 A1* | 7/2012 | Gao | ................ | H04B 7/0697 370/330 |
| 2013/0028341 A1 | 1/2013 | Ayach et al. | | |

OTHER PUBLICATIONS

PCT International Application No. PCT/KR2014/001512, Written Opinion of the International Searching Authority dated May 27, 2014, 10 pages.

\* cited by examiner (a)

(b)

(a)

(b)

METHOD FOR EFFICIENTLY TRANSMITTING SIGNAL IN MULTI-ANTENNA WIRELESS COMMUNICATION SYSTEM AND APPARATUS FOR SAME

CROSS-REFERENCE TO RELATED APPLICATIONS

This application is the National Stage filing under 35 U.S.C. 371 of International Application No. PCT/KR2014/001512, filed on Feb. 25, 2014, which claims the benefit of U.S. Provisional Application Nos. 61/769,147, filed on Feb. 25, 2013 and 61/774,569, filed on Mar. 7, 2013, the contents of which are all hereby incorporated by reference herein in their entirety.

FIELD OF THE INVENTION

The present invention relates to a wireless communication system and, more particularly, to a method for efficiently transmitting a signal in a multi-antenna wireless communication system and apparatus for the same.

BACKGROUND ART

MIMO (multiple input multiple output) refers to a method for improving transmission/reception data efficiency using a plurality of transmit (Tx) antenna and a plurality of receive (Rx) antennas instead of a single Tx antenna and a single Rx antenna. That is, MIMO is a scheme in which a transmitting end or a receiving end of a wireless communication system improves capacity or enhances performance using multiple antennas. MIMO may be referred to as multi-antenna technology.

To support multi-antenna transmission, a precoding matrix for appropriately distributing transmission information to antenna s according to channel state can be applied. 3GPP (3rd Generation Partnership Project) LTE (Long Term Evolution) supports a maximum of 4 Tx antennas (4Tx) for downlink transmission and defines a precoding codebook for downlink transmission using the Tx antennas.

In a MIMO based cellular communication environment, data transfer rate can be improved through beamforming between a transmitting end and a receiving end. Whether beamforming is applied is determined based on channel information, a channel estimated through a reference signal at the receiving end is appropriately quantized using a codebook and fed back to the transmitting end.

A description will be given of a spatial channel matrix (or channel matrix) which can be used to generate a codebook. The spatial channel matrix (or channel matrix) can be represented as follows.

$$H(i,k) = \begin{bmatrix} h_{1,1}(i,k) & h_{1,2}(i,k) & \ldots & h_{1,Nt}(i,k) \\ h_{2,1}(i,k) & h_{2,2}(i,k) & \ldots & h_{2,Nt}(i,k) \\ \vdots & \vdots & \ddots & \vdots \\ h_{Nr,1}(i,k) & h_{Nr,2}(i,k) & \ldots & h_{Nr,Nt}(i,k) \end{bmatrix}$$

Here, H(i,k) represents a spatial channel matrix, $N_r$ denotes the number of Rx antennas, $N_t$ denotes the number of Tx antennas, r is an Rx antenna index, t is a Tx antenna index, i represents an OFDM (or SC-FDMA) symbol index and k represents a subcarrier index.

$h_{r,t}(i,k)$ is an element of the channel matrix H(i,k) and represents an r-th channel state and a t-th antenna corresponding to an i-th symbol and k-th subcarrier.

In addition, a spatial channel covariance matrix which can be used in the present invention will now be briefly described. The spatial channel covariance matrix can be represented by R.

$$R = E[H_{i,k}^H H_{i,k}]$$

where H denotes a spatial channel matrix and R denotes a spatial channel covariance matrix. In addition, E[] represents the mean, i represents a symbol index and k represents a frequency index.

SVD (Singular Value Decomposition) is a method for decomposing a rectangular matrix, which is widely used in signal processing and statistics. SVD is to normalize matrix spectrum theory for an arbitrary rectangular matrix. An orthogonal square matrix can be decomposed into diagonal matrices using an Eigen value as a basis using spectrum theory. When it is assumed that the channel matrix H is an m×n matrix composed of a plurality of set elements, the matrix H can be represented as a product of three matrices as follows.

$$H_{m \times n} = U_{m \times m} \Sigma_{m \times n} V_{n \times n}^H$$

Here, U and V represent unitary matrices and denotes an m×n matrix including a non-zero singular value. The singular value is $\Sigma = \text{diag}(\sigma_1 \ldots \sigma_r)$, $\sigma_i = \sqrt{\lambda_i}$. Representation as a product of three matrices is referred to as SVD. SVD can handle normal matrices, compared to Eigen value decomposition which can decompose only orthogonal square matrices. SVD and Eigen value composition are related to each other.

When the matrix H is a positive definite Hermitian matrix, all Eigen values of H are non-negative real numbers. Here, singular values and singular vectors of H are equal to Eigen values and Eigen vectors of H. Eigen value decomposition (EVD) can be represented as follows (here, Eigen values may be $\lambda_1, \ldots, \lambda_r$).

$$HH^H = (U \Sigma V^H)(U \Sigma V^H)^H = U \Sigma \Sigma^T U^H$$

$$H^H H = (U \Sigma V^H)^H (U \Sigma V^H) = V \Sigma^T \Sigma V$$

Here, Eigen values can be $\lambda_1, \ldots, \lambda_r$. Information on U between U and V, which indicate channel directions, can be known through singular value decomposition of $HH^H$ and information on V can be known through singular value decomposition of $H^H H$. In general, a transmitting end and a receiving end respectively perform beamforming in order to achieve higher throughput in multi-user MIMO (MU-MIMO). When a receiving end beam and a transmitting end beam are represented by matrices T and W, a channel to which beamforming is applied is indicated by THW=TU(Σ)VW. Accordingly, it is desirable to generate the receiving end beam on the basis of U and to generate the transmitting end beam on the basis of V in order to accomplish higher throughput.

In designing a codebook, it is necessary to reduce feedback overhead using as few bits as possible and to correctly quantize a channel to obtain a sufficient beamforming gain. One of codebook design schemes presented or adopted as a standard by recent mobile communication systems, such as 3GPP LTE (3rd Generation Partnership Project Long Term Evolution), LTE-Advanced and IEEE 16m, is to transform a codebook using a long-term covariance matrix of a channel, as represented by Equation 1.

$$W' = \text{norm}(RW) \quad \text{[Equation 1]}$$

Here, W denotes an existing codebook generated to reflect short-term channel information, R denotes a long-term covariance matrix of channel matrix H, norm(A) represents a matrix in which norm is normalized into 1 per column of matrix A, and W' represents a final codebook generated by transforming the codebook W using the channel matrix H, the long-term covariance matrix R of the channel matrix H and a norm function.

The long-term covariance matrix R of the channel matrix H can be represented as Equation 2.

$$R = E[H^H H] = V\Lambda V^H = \sum_{i=1}^{Nt} \sigma_i v_i v_i^H \quad \text{[Equation 2]}$$

Here, the long-term covariance matrix R of the channel matrix H is decomposed into $V\Lambda V^H$ according to singular value decomposition. V is an Nt×Nt unitary matrix having $V_i$ as an i-th column vector, $\Lambda$ is a diagonal matrix having $\sigma_i$ as an i-th diagonal component and $V^H$ is a Hermitian matrix of V. In addition, $\sigma_i$ and $V_i$ respectively denote an i-th singular value and an i-th singular column vector corresponding thereto ($\sigma_1 \geq \sigma_2 \geq \ldots \geq \sigma_{Nt}$).

DETAILED DESCRIPTION OF THE INVENTION

Technical Objects

A technical object of the present invention is to provide an efficient feedback transmission method in a wireless communication system and a device for the same.

The technical objects of the present invention will not be limited only to the objects described above, and, accordingly, other technical objects that have not been mentioned above may become apparent to those having ordinary skill in the art from the description presented below.

Technical Solutions

In order to achieve the above-described problem, according to an aspect of the present invention, a method for a transmitting end transmitting a signal in a wireless communication system supporting a multi-antenna includes a step of transmitting a downlink signal based on a precoding matrix (W) for an antenna comprising a plurality of antenna elements aligned perpendicularly, wherein the precoding matrix (W) corresponds to a codebook configured so that phase increase is limited with respect to a plurality of precoding vector values populating a same column.

In order to achieve the above-described problem, according to another aspect of the present invention, a base station transmitting a signal in a wireless communication system supporting a multi-antenna includes a Radio Frequency Unit (RF Unit); and a Processor, wherein the Processor is configured to transmit a downlink signal based on a precoding matrix (W) for an antenna comprising a plurality of antenna elements aligned perpendicularly, wherein the precoding matrix (W) corresponds to a codebook configured so that phase increase is limited with respect to a plurality of precoding vector values populating a same column.

Advantageous Effects

According to an exemplary embodiment of the present invention, an efficient feedback transmission method in a wireless communication system and a device for the same may be provided.

The effects of the present invention will not be limited only to the effects described above, and, accordingly, other effects that have not been mentioned above may become apparent to those having ordinary skill in the art from the description presented below.

BRIEF DESCRIPTION OF THE DRAWINGS

The accompanying drawings, which are included as a part of the detailed description in order to provide a further understanding of the present invention, provide exemplary embodiments of the present invention and describe the technical aspects of the present invention along with the detailed description.

BEST MODE FOR CARRYING OUT THE PRESENT INVENTION

Figure 1:
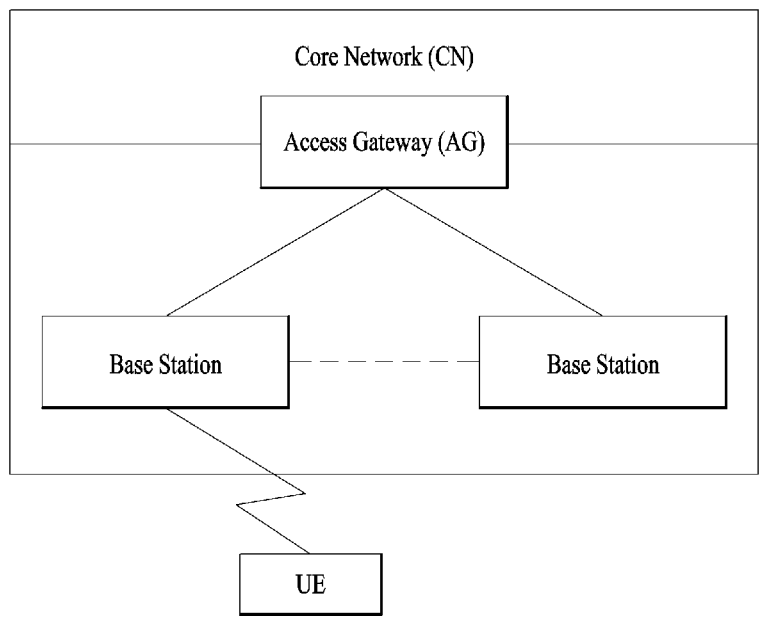
FIG. 1 illustrates a general view of an E-UMTS network structure as an example of a communication system.

Hereinafter, the preferred embodiments of the present invention will now be described in detail with reference to the accompanying drawings. The detailed description of the present invention that is to be disclosed along with the appended drawings is merely given to provide to describe the exemplary embodiment of the present invention, and, therefore, the embodiments presented in this specification do not correspond to the only embodiments that can be realized according to the present invention. The following description of the present invention shall include the description of detailed features of the present invention in order to provide full and complete understanding of the present invention. However, it will be apparent to those skilled in the art that the present invention can be realized even without the detailed features described herein. For example, although the following description will be made based on a mobile communication system corresponding to a 3GPP LTE system, the following description can be applied to other mobile communication systems except for the unique features of 3GPP LTE.

In some cases, in order to avoid any ambiguity in the concept (or idea) of the present invention, some of the structures and devices disclosed (or mentioned) in the present invention may be omitted from the accompanying drawings of the present invention, or the present invention may be illustrated in the form of a block view focusing only on the essential features or functions of each structure and device. Additionally, throughout the entire description of the present invention, the same reference numerals will be used for the same elements of the present invention.

Furthermore, in the following description, it will be assumed that UE will collectively refer to mobile or fixed user-end devices, such as a UE (User Equipment), MS (Mobile Station), AMS (Advanced Mobile Station), and so on. Additionally, it will also be assumed that the base station will collectively refer to an arbitrary node of a network end communication with the UE, such as Node B, eNode B, Base Station, AP (Access Point), and so on.

In the mobile communication station, the UE (User Equipment) may receive information from the BS via Downlink, and the UE may also transmit information via Uplink. The information being transmitted or received by the UE may correspond to data and diverse control information, and diverse physical channel exist in accordance with different purposes of the information being transmitted or received by the UE.

As an example of a communication system to which the present invention may be applied, a 3GPP LTE ($3^{rd}$ Generation Partnership Project Long Term Evolution; hereinafter referred to as "LTE"), LTE-Advanced (hereinafter referred to as 'LTE-A') communication system will now be generally described.

FIG. 1 illustrates a general view of an E-UMTS network structure as an example of a communication system.

The E-UMTS (Evolved Universal Mobile Telecommunications System) corresponds to a system evolved from the conventional (or legacy) UMTS (Universal Mobile Telecommunications System). The 3GPP is presently carrying out a basic standardization process for the E-UMTS. Generally, the E-UMTS may also be referred to as an LTE (Long Term Evolution) system. For details of the technical specifications of the UMTS and the E-UMTS, reference may be made to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG), which is located at an end of a network (E-UTRAN) and connected to an external network. The base stations (BSs) may simultaneously transmit multiple data streams for a broadcast service, a multicast service and/or a unicast service.

One or more cells may exist for one BS. One cell is set to one of bandwidths of 1.25, 2.5, 5, 10, 15, and 20 Mhz to provide a downlink or uplink transport service to several UEs. Different cells may be configured to provide different bandwidths. Also, one BS controls data transmission and reception for a plurality of UEs. The BS transmits Downlink (DL) scheduling information of downlink data to the corresponding UE to notify information related to time/frequency domains to which data will be transmitted, encoding, data size, and Hybrid Automatic Repeat and reQuest (HARQ).

Additionally, the BS transmits Uplink (UL) scheduling information of uplink data to the corresponding UE to notify information related to time and frequency domains that can be used by the corresponding UE, encoding, data size, and Hybrid Automatic Repeat and reQuest (HARQ). An interface for transmitting user traffic or control traffic can be used between the BSs. A Core Network (CN) may include the AG and a network node or the like for user registration of the UE. The AG manages mobility of a UE on a TA (Tracking Area) unit basis, wherein one TA unit includes a plurality of cells.

The wireless communication technology has been developed up to the LTE based upon Wideband Code division Multiple Access (WCDMA). However, the demands and expectations of the users and the manufacturers and providers are growing continuously. Also, since other wireless access technologies are constantly being developed, the wireless communication technology is required to newly evolve in order to ensure competiveness in the future. Accordingly, characteristics, such as reduced cost for each bit, extended service availability, usage of a flexible frequency band, simple structure and open interface, and adequate power consumption of the UE are being requested.

Recently, in 3GPP, standardization procedures for a successive technology of LTE have been carried out. In this specification, the successive technology will be referred to as "LTE-Advanced" or "LTE-A". One of the main differences between an LTE system and an LTE-A system corresponds to a difference in the system bandwidth. The LTE-A system is targeted to support a maximum wide band of 100 MHz, and, for this, the LTE-A system is designed to use carrier aggregation or bandwidth aggregation technology that can achieve wide band by using multiple frequency blocks. In order to use a wider frequency bandwidth, carrier aggregation is designed to use multiple frequency blocks as a single large logical frequency band. The bandwidth of each frequency block may be defined based upon a bandwidth of a system block, which is used in an LTE system. Each frequency block is transmitted by using a component carrier.

Figure 2:
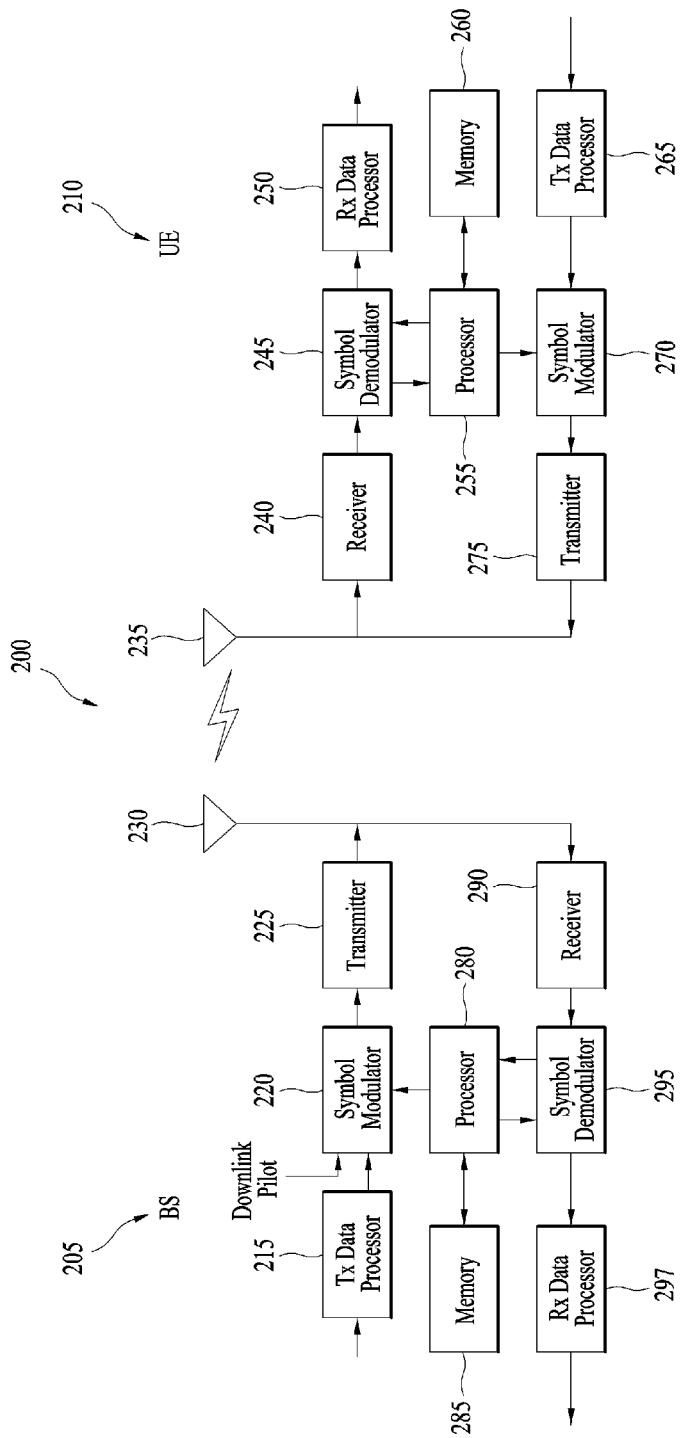
FIG. 2 illustrates structures of a base station (105) and a user equipment (110) in a wireless communication system (100).

FIG. 2 illustrates structures of a base station (105) and a user equipment (110) in a wireless communication system (100).

In order to illustrate a simplified structure of the wireless communication system (100), although the wireless communication system (100) is shown to include one base station (BS) (105) and one user equipment (UE) (110), the wireless communication system (100) may include at least one or more BSs and/or at least one or more UEs.

Referring to FIG. 2, the BS (105) may include a transmission (Tx) data processor (115), a symbol modulator (120), a transmitter (125), a transceiving antenna (130), a processor (180), a memory (185), a receiver (190), a symbol demodulator (195), and a reception data processor (197). And, the UE (110) may include a transmission (Tx) data processor (165), a symbol modulator (170), a transmitter (175), a transceiving antenna (135), a processor (155), a memory (160), a receiver (140), a symbol demodulator (155), and a reception data processor (150). Although it is shown in the drawing that the BS (105) and the UE (110) each includes only one antenna (130, 135), the BS (105) and the UE (110) each corresponds to a multi-antenna being equipped with a plurality of antennae. Therefore, the BS (105) and the UE (110) according to the present invention support a MIMO (Multiple Input Multiple Output) system. Additionally, the BS (105) and the UE (110) according to the present invention may support both SU-MIMO (Single User-MIMO) and MU-MIMO (Multi User-MIMO) schemes (or methods).

Within the downlink, the transmission data processor (115) receives traffic data, formats the received traffic data, codes the formatted traffic data, interleaves and modulates (or symbol-maps) the coded traffic data, and provides the modulated symbols ("data symbols"). The symbol modulator (120) receives and processes such data symbols and pilot symbols and provides a stream of symbols.

The symbol modulator (120) multiplexes data and pilot symbols and transmits the multiplexed symbols to the transmitter (125). Herein, each of the transmitted symbols may correspond to a data symbol, a pilot symbol, or a signal value of zero. In each symbol cycle (or duration), the pilot symbols may be consecutively transmitted. The pilot symbols may correspond to Frequency Division Multiplexing (FDM), Orthogonal Frequency Division Multiplexing (OFDM), Time Division Multiplexing (TDM), or Code Division Multiplexing (CDM) symbols.

The transmitter (125) receives the stream of symbols and converts the received stream to at least one or more analog signals, and, also, by additionally adjusting (e.g., by amplifying, filtering, and frequency upconverting such analog signals, the transmitter (125) generates a downlink signal, which is suitable for transmission through a wireless channel (or radio channel). Thereafter, the downlink signal is transmitted to the UE through the antenna (130).

In the UE (110), the antenna (135) receives the downlink signal from the BS and provides the received signal to the receiver (140). The receiver (140) adjusts (e.g., performs filtering, amplification, and frequency downconverting) and acquires samples by digitalizing the adjusted signals. The symbol demodulator (145) demodulates the received pilot symbols and provides the demodulated pilot symbols to the processor (125) for channel estimation.

Additionally, the symbol demodulator (145) receives a frequency response estimation value respective to the downlink from the processor (155), performs data demodulation on the received data symbols, acquires data symbol estimation values (corresponding to estimation values of the transmitted data symbols), and provides the data symbol estimation values to the reception (Rx) data processor (150). The reception data processor (150) performs demodulation (i.e., symbol demapping), deinterleaving, and decoding on the symbol estimation values, so as to recover the transmitted traffic data.

The processing of the symbol demodulator (145) and the reception data processor (150) is complementary to the processing of the symbol modulator (120) and the transmission data processor (115) in the BS (105).

The UE (110), in the uplink, the transmission data processor (165) processes traffic data and provides data symbols. The symbol modulator (170) receives and multiplexes data symbols and performs modulation, thereby being capable of providing a stream of symbols to the transmitter (175). The transmitter (175) receives and processes the stream of symbols, so as to generate an uplink signal, and, then, such uplink signal is transmitted to the BS (105) through the antenna (135).

In the BS (105), the uplink signal is received from the UE (110) through the antenna (130), and the receiver (190) acquires samples by processing the received uplink signal. Subsequently, the symbol demodulator (195) processes the acquired samples and provides pilots symbols that are received with respect to the uplink and the data symbol estimation values. The reception data processor (197) processes the data symbol estimation values, so as to recover the traffic data, which are transmitted from the UE (110).

Each of the processors (155, 180) respectively belonging to the UE (110) and the BS (105) directs operations (e.g., control, adjustment, management, and so on) performed in each of the UE (110) and the BS (105). Each of the processors (155, 180) may be respectively connected to memory units (160, 185), which store program codes and data. The memories (160, 185) are connected to the processor (180) and store an operating system, applications, and general files.

The processor (155, 180) may also be referred to as a controller, a microcontroller, a microprocessor, a microcomputer, and so on. Meanwhile, the processor (155, 180) may be realized in the form of hardware or firmware, software, or in a combination of hardware, firmware, and/or software. In case of implementing the exemplary embodiment of the present invention in the form of hardware, ASICs (Application Specific Integrated Circuits), DSPs (Digital Signal Processors), DSPDs (Digital Signal Processing Devices), PLDs (Programmable Logic Devices), FPGAs (Field Programmable Gate Arrays), which are configured to perform the present invention, may be provided in the processor (155, 180). Meanwhile, in case of implementing the exemplary embodiments of the present invention in the form of firmware or software, the firmware or software may be configured to include modules, procedures, or functions performing the functions or operations of the present invention, and, the firmware or software, which is configured to be capable of performing the present invention, may be equipped inside the processor (155, 180) or may be stored in the memory (160, 185) and then operated by the processor (155, 180).

Layers of a wireless interface protocol between a wireless communication system (network) of the UE and the BS may be categorized into a first layer (L1), a second layer (L2), and a third layer (L3) based upon 3 lower layers of an OSI (open system interconnection) model, which is well-known in the communication system. A physical layer corresponds to the first layer and provides information transmission service through a physical channel. An RRC (Radio Resource Control) layer belongs to the third layer and provides control radio resources between the UE and the network. The UE and the BS may exchange RRC messages with the wireless communication network through the RRC layer.

The term base station, which is used in the specification, may also be referred to as a cell or sector in case of being used in a regional sense. A serving base station (or cell) may be viewed as a base station providing the conventional (or legacy) main services to the user equipment, and a serving base station (or cell) may perform transception (transmission/reception) of control information within a coordinated multiple transmission point. In this respect, the serving base station (or cell) may be referred to as an anchor base station (or cell) (anchor cell). Similarly, a neighboring base station may also be referred to as a neighboring cell that is being used in the regional sense.

Multiple Antenna (MIMO) System

A multiple antenna (MIMO) technology relates to an application of a technology that completes a message by collecting (or gathering) segmented data fragments, each received from multiple antennae, without relying on a single antenna path in order to receive a message. Since a data transmission rate may be enhanced within a predetermined range, or since the multiple antenna system may increase a system range respective to a specific data transmission rate, the multiple antenna technology corresponds to a next generation mobile communication technology that may be broadly used in mobile communication terminal and relay stations, and so on, and, due to its expansion in data communication, the multiple antenna technology is being regarded as a next generation technology that can overcome the restrictions in transmission size in mobile communication, which has reached its limit.

Figure 3:
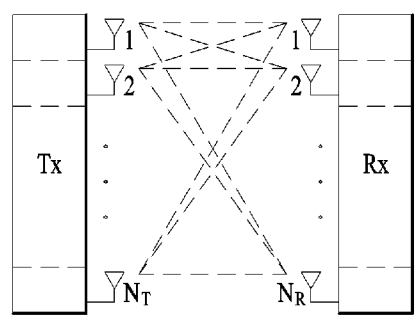
FIG. 3 illustrates a schematic view of a general multi-antenna (MIMO) communication system.
Figure 3:
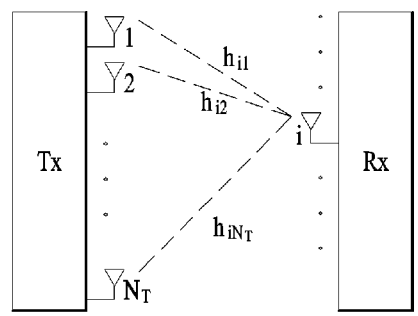

FIG. 3(a) illustrates a block view showing the structure of a general multiple antennae (MIMO) communication system. As shown in FIG. 3(a), when the number of transmission antennae is increased to $N_T$ number of transmission antennae, and then the number of reception antennae is increased to $N_R$ number of reception antennae, at the same time, unlike the case when multiple antennae are only used in the transmitting end and the receiving end, a channel transmission capacity may theoretically be more increased in proportion to the number of antennae. Therefore, the transmission rate may be enhanced, and a frequency efficiency may also be enhanced remarkably. A transmission rate respective to the increase in the channel transmission capacity may be theoretically increased as much as the maximum transmission rate (R0), which corresponds to a case when one antenna is used, being multiplied by an increase rate (RI) shown below in Equation 1.

$$R_i = \min(N_T, N_R)$$ [Equation 3]

For example, in a MIMO communication system using 4 transmission antennae and 4 reception antennae, a theoretical transmission rate 4 times that of a single antenna system may be acquired. Evidence of such theoretical capacity increase of the multiple antennae system was found and proven in the mid 90's. And, since then, diverse technologies for actually enhancing the data transmission rate have been under research and development. And, among such technologies, some of the technologies are already being applied in diverse wireless communication standards, such as the 3$^{rd}$ generation mobile communication and the next generation wireless LAN.

Up to the current time, the research and development associated to multiple antennae have been actively and diversely carried out in many aspects, such as research in the aspect of information theory associated to multiple antennae communication capacity calculation in diverse channel environments and multiple access environments, research in drawing out wireless channel measurements and models of a multiple antennae system, research in time/space signal processing technologies for enhancing transmission reliability and for enhancing the transmission rate, and so on.

In order to provide a more detailed description of the communication method in a multiple antennae system, a mathematical modeling of the communication method may be shown as follows. As shown in FIG. 3(a), it will be assumed that $N_T$ number of transmission antennae and $N_R$ number of reception antennae exist herein. First of all, in case of a transmitted signal (or transmission signal), since a maximum number of information available for transmission in equal to $N_T$, when $N_T$ number of transmission antennae exists, the transmission information may be indicated in the form of a vector as shown in Equation 4 below.

$$s = [s_1, s_2, \ldots, s_{N_T}]^T$$ [Equation 4]

Meanwhile, a transmission power may vary for each of the transmission information $s_1, s_2, \ldots, s_{N_T}$. And, in this case, when each of the transmission power is referred to as $P_1, P_2, \ldots, P_{N_T}$, the transmission information having its transmission power adjusted may be expressed in a vector form as shown in Equation 5 below.

$$\hat{s} = [\hat{s}_1, \hat{s}_2, \ldots, \hat{s}_{N_T}]^T = [Ps_1, Ps_2, \ldots, Ps_{N_T}]^T$$ [Equation 5]

Also, by using a diagonal matrix P of the transmission power, $\hat{s}$ may be indicated as shown in Equation 6 below.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps$$ [Equation 6]

Meanwhile, consideration will be made on the configuration of $N_T$ number of transmitted signals $x_1, x_2, \ldots, x_{N_T}$ that are actually being transmitted, when a weight matrix W is applied to the information vector $\hat{s}$ having its transmission power adjusted. Herein, the weight matrix performs the role of adequately distributing transmission information to each antenna in accordance with the transmission channel status (or situation). Such transmitted signals $x_1, x_2, \ldots, x_{N_T}$ may be expressed as shown in Equation 7 by using the vector X.

Herein, $W_{ij}$ represents a weight between an $i^{th}$ transmission antenna and a $j^{th}$ information. W is referred to as a Weight Matrix or a Precoding Matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{12} & w_{12} & \cdots & w_{2N_T} \\ \vdots & & \ddots & \\ w_{i2} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} =$$ [Equation 7]

$$W\hat{s} = WPs$$

In case $N_R$ number of reception antennae exist, the reception signal of each antenna $y_1, y_2, \ldots, y_{N_R}$ may be expressed as a vector as shown below in Equation 8.

$$y = [y_1, y_2, \ldots, y_{N_R}]^T$$ [Equation 8]

Meanwhile, in case of modeling a channel respective to a multi-antenna communication system, the channel may be differentiated in accordance with a transmission/reception antenna index, and a channel starting from a transmission antenna j to a reception antenna i will hereinafter be expressed as $h_{ij}$. Herein, it shall be noted that, in an index order of $h_{ij}$, a reception antenna index comes first and then a transmission antenna index comes next.

Such channels may also be marked (or expressed) in vector and matrix formats by grouping multiple channels to a single group. FIG. 3(b) illustrates a channel starting from $N_T$ number of transmission antennae and a reception antenna i.

As shown in FIG. 3(b), a channel starting from a total of $N_T$ number of transmission antennae and arriving at reception antenna i may be expressed as shown below.

$$h_{h_i\,T} = [h_{i1}, h_{i2}, \ldots, h_{iN_T}]$$ [Equation 9]

Additionally, in case of indicating all of the channels starting from $N_T$ number of transmission antennae to $N_R$ number of reception antennae by using a matrix expression as shown above in Equation 9, this may be expressed as shown below in Equation 10.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{12} & h_{12} & \cdots & h_{2N_T} \\ \vdots & & \ddots & \\ h_{i2} & h_{i2} & \cdots & h_{iN_T} \\ \vdots & & \ddots & \\ h_{N_R 1} & h_{N_R 2} & \cdots & h_{N_R N_T} \end{bmatrix}$$ [Equation 10]

Since an actual channel passes through a channel matrix H, as shown above, and then has an AWGN (Additive White Gaussian Noise) added thereto, if the AWGN $n_1, n_2, \ldots, n_{N_R}$ added to each of the $N_R$ number of reception antennae is expressed in the form of a vector, it may be as shown below in Equation 11.

$$n = [n_1, n_2, \ldots, n_{N_R}]^T$$ [Equation 11]

A received signal that is acquired by using the Equations presented above may be expressed as shown below in Equation 12.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{12} & h_{12} & \cdots & h_{2N_T} \\ \vdots & & \ddots & \vdots \\ h_{i2} & h_{i2} & \cdots & h_{iN_T} \\ \vdots & & \ddots & \vdots \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 12]}$$

$$Hx + n$$

Meanwhile, a number of columns and rows of the channel matrix H, which indicates a channel situation (or status), is decided by the number of transmission antennae and the number of reception antennae. In the channel matrix H, the number of rows is identical to the number of reception antennae ($N_R$), and the number of columns is identical to the number of transmission antennae (NT). More specifically, the channel matrix H may be expressed as a $N_R \times N_T$ matrix. Generally, between the number of rows and the number of columns each being independent from one another, a rank of a matrix is defined by the smaller number. Accordingly, the rank of the matrix cannot have a value that is greater than the number of rows or the number of columns within the matrix. The rank of the channel matrix H may be expressed as Equation 13 shown below.

$$\text{rank}(H) \leq \min(N_T, N_R) \qquad \text{[Equation 13]}$$

For the multiple antenna transmission/reception scheme, which is being used for performing operation of a multiple antenna system, FSTD (frequency switched transmit diversity), SFBC (Space Frequency Block Code), STBC (Space Time Block Code), CDD (Cyclic Delay Diversity), TSTD (time switched transmit diversity), and so on, may be used. In Rank 2 or higher, Spatial Multiplexing (SM), GCDD (Generalized Cyclic Delay Diversity), S-VAP (Selective Virtual Antenna Permutation), and so on, may be used.

FSTD corresponds to a method of gaining diversity gain by allocating subcarriers of different frequencies for each signal being transmitted to each of the multiple antennae. SFBC corresponds to a method that can ensure both a diversity gain in the corresponding dimension and a multiple user scheduling gain by efficiently applying selectivity in the spatial domain and the frequency domain. STBC corresponds to a method of applying selectivity in a spatial domain and a temporal domain. CDD corresponds to a method of gaining diversity gain by using a path delay between each transmission antenna. TSTD corresponds to a method of differentiating signals being transmitted to the multiple antennae with respect to time. Spatial multiplexing corresponds to a method of increasing transmission rate by transmitting different data for each antenna. GCDD corresponds to a method of applying selectivity in a time domain and a frequency domain. S-VAP corresponds to a method using a single precoding matrix, which may be divided into a MCW (Multi Codeword) S-VAP intermixing multiple codewords between the antennae in spatial diversity or spatial multiplexing and a SCW (Single Codeword) S-VAP using a single codeword.

Among the above-described MIMO transmission schemes (or methods), the STBC method corresponds to a method of gaining time diversity by having the same data symbol iterated (or repeated) by using a method of supporting orthogonality in a time domain. Similarly, the SFBC method corresponds to a method of gaining frequency diversity by having the same data symbol iterated (or repeated) by using a method of supporting orthogonality in a frequency domain. Examples of a time block code used in the STBC and a frequency block code used in the SFBC are as shown below in Equations 14 and 15. Equation 14 indicates a block code corresponding to a case when 2 transmission antennae are used, and Equation 15 indicates a block code corresponding to a case when 4 transmission antennae are used.

$$\frac{1}{\sqrt{2}} \begin{pmatrix} S_1 & S_2 \\ -S_2^* & S_1^* \end{pmatrix} \qquad \text{[Equation 14]}$$

$$\frac{1}{\sqrt{2}} \begin{pmatrix} S_1 & S_2 & 0 & 0 \\ 0 & 0 & S_3 & S_4 \\ -S_2^* & S_1^* & 0 & 0 \\ 0 & 0 & -S_4^* & S_3^* \end{pmatrix} \qquad \text{[Equation 15]}$$

In Equations 14 and 15, $S_i$ (i=1, 2, 3, 4) represent modulated data symbols. Additionally, in the matrices of Equations 14 and 15, the row of each matrix indicates the antenna port, and the column of each matrix indicates time (in case of STBC) or frequency (in case of SFBC).

Codebook Based Precoding Method

In order to support multi-antennae transmission, precoding that can adequately distribute the transmission information to each antenna in accordance with the channel situation may be applied. The codebook based precoding method refers to a method, wherein the transmitting end and the receiving end decide a precoding matrix group in advance, wherein the receiving end (e.g., UE) measures channel information received from the transmitting end (e.g., base station) and then feeds-back to the transmitting end information on the precoding matrix that corresponds to the best-fitting precoding matrix (i.e., Precoding Matrix Index (PMI), and wherein the transmitting end applies the adequate precoding to the signal transmission based upon the PMI.

Since this corresponds to a method of selecting an adequate precoding matrix from a pre-decided (or pre-defined) precoding matrix group, although an optimal precoding is not always applied, this method is advantageous in that the feedback overhead can be reduced as compared to explicitly feeding-back optimal precoding information to the actual channel information.

Figure 4:
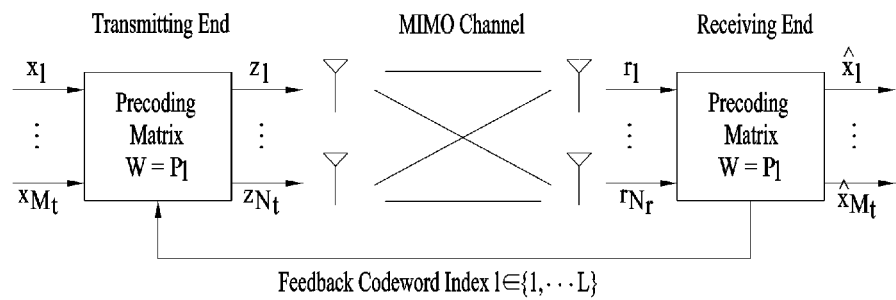
FIG. 4 illustrates a basic concept of codebook based precoding.

FIG. 4 illustrates a basic concept of codebook based precoding.

In case of following the codebook based precoding method, the transmitting end and the receiving end share codebook information, which includes a predetermined number of precoding matrices that are pre-decided in accordance with the transmission rank, number of antennae, and so on. More specifically, in case the feedback information is finite, the codebook based precoding method may be used. The receiving end may measure a channel status through the received signal and may, then, feed-back a finite number of precoding matrix information (i.e., index of a corresponding precoding matrix) to the transmitting end based upon the above-described codebook information. For example, the receiving end may select an optimal precoding matrix by measuring a reception signal by using a ML (Maximum Likelihood) or MMSE (Minimum Mean Square Error) method. In FIG. 4, although it is shown that the receiving end is transmitting precoding matrix information to the transmitting end with respect to each codeword, the present invention will not be required to be limited only to this.

After receiving the feedback information from the receiving end, the transmitting end may select a specific precoding matrix from the codebook based upon the received information. After selecting the precoding matrix, the transmitting end may perform precoding by using a method of multiplying a number of layer signals corresponding to the transmission rank by the selected precoding matrix, and, then, the transmitting end may transmit the transmission signal, which is processed with precoding, to the receiving end through multiple antennae. In the precoding matrix, the number of rows is equal to the number of antennae, and the number of columns is equal to the rank value. Since the rank value is equal to the number of layers, the number of columns is equal to the number of layers. For example, in case the number of transmission antennae is equal to 4, and in case the number of transmission layers is equal to 2, the precoding matrix may be configured as a 4×2 matrix. By using the precoding matrix, the information being transmitted through each of the layers may be respectively mapped to each antenna.

After receiving the signal, which is precoded and transmitted by the transmitting end, the receiving end may perform an inverse processing of the precoding, which was performed in the transmitting end, and may then recover the reception signal. Generally, since a precoding matrix satisfies a unitary matrix (U) condition, such as, $U*U^H=I$, the above-described inverse-processing of precoding may be realized by using a method of multiplying an Hermit matrix ($P^H$) of the precoding matrix (P), which is used in the precoding process of the transmitting end, by the reception signal.

For example, Table 1 shown below represents a codebook that is used for a downlink transmission by using 2 transmission antennae in 3GPP LTE Release-8/9, and Table 2 represents a codebook that is used for a downlink transmission by using 4 transmission antennae in 3GPP LTE Release-8/9.

In Table 2, $W_n^{\{s\}}$ is obtained as set $\{s\}$, which is configured from an equation that is expressed as $W_n=I-2u_n u_n^H/u_n^H u_n$. At this point, I represents a 4×4 singular matrix, and $u_n$ corresponds to a value given in Table 2.

As shown in Table 1 presented above, a codebook respective to 2 transmission antennae has a total of 7 precoding vectors/matrices, and, herein, since the singular matrix is used for an open-loop system, a total of 6 precoding vectors/matrices are used for the precoding process in a closed loop system. Additionally, in case of a codebook respective to 4 transmission antennae, as shown in Table 2, the codebook has a total of 64 precoding vectors/matrices.

The above-described codebook has common properties, such as a Constant modulus (CM) property, a Nested property, a Constrained alphabet property, and so on. The CM property corresponds to a property, wherein each element of all precoding matrices included in the codebook does not include '0', and wherein each element is configured to have the same size. The Nested property signifies that a precoding matrix of a lower rank is designed to be configured as a subset of a specific column included in a precoding matrix of a higher rank. The Constrained alphabet property signifies that the alphabets of each element of all precoding matrices included in the codebook are configured of $$\left\{\pm 1, \pm j, \pm \frac{(1+j)}{\sqrt{2}}, \pm \frac{(-1+j)}{\sqrt{2}}\right\}.$$

In Table 2, $W_n^{\{s\}}$ is obtained as set $\{s\}$, which is configured from an equation that is expressed as $W_n=I-2u_n^H/u_n^H u_n$. At this point, I represents a 4×4 singular matrix, and $u_n$ corresponds to a value given in Table 2.

As shown in Table 1 presented above, a codebook respective to 2 transmission antennae has a total of 7 precoding vectors/matrices, and, herein, since the singular matrix is used for an open-loop system, a total of 6 precoding vectors/matrices are used for the precoding process in a closed loop system. Additionally, in case of a codebook respective to 4 transmission antennae, as shown in Table 2, the codebook has a total of 64 precoding vectors/matrices.

The above-described codebook has common properties, such as a Constant modulus (CM) property, a Nested property, a Constrained alphabet property, and so on. The CM

TABLE 1

| Codebook index | Number of layers v | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{2}\begin{bmatrix}1 & 1\\j & -j\end{bmatrix}$ |
| 3 | $\frac{1}{\sqrt{2}}\begin{bmatrix}1\\-j\end{bmatrix}$ | — |

TABLE 4

| Codebook Index | $u_n$ | Number of layers v | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{1234\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{1234\}}/2$ |
| 4 | $u_4 = [1(-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1(1-j)/\sqrt{2}\ j\ (-1-j)/\sqrt{2}]^T$ | $W_5^{\{1\}}$ | $W_5^{\{12\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1234\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1234\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1234\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1234\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1234\}}/2$ |
| 14 | $u_{14} = [1\ 1\ -1\ 1]^T$ | $W_{14}^{\{1\}}$ | $W_{14}^{\{13\}}/\sqrt{2}$ | $W_{14}^{\{123\}}/\sqrt{3}$ | $W_{14}^{\{1234\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ | property corresponds to a property, wherein each element of all precoding matrices included in the codebook does not include '0', and wherein each element is configured to have the same size. The Nested property signifies that a precoding matrix of a lower rank is designed to be configured as a subset of a specific column included in a precoding matrix of a higher rank. The Constrained alphabet property signifies that the alphabets of each element of all precoding matrices included in the codebook are configured of $$\left\{ \pm 1, \pm j, \pm \frac{(1+j)}{\sqrt{2}}, \pm \frac{(-1+j)}{\sqrt{2}} \right\}.$$

Feedback Channel Structure

Basically, in a FDD (Frequency Division Duplex) system, since the base station cannot know the information on a downlink channel, the channel information that is fed-back by the user equipment (UE) is used for the downlink transmission. In case of the legacy 3GPP LTE Release-8/9 system, the UE may feed-back downlink channel information through a PUCCH or may feed-back downlink channel information through a PUSCH. In case of the PUCCH, the channel information is fed-back periodically, and, in case of the PUSCH, the channel information is fed-back periodically. Additionally, the feedback of the channel information may feed-back the channel information respective to the entire frequency band (i.e., WideBand (WB)), and the feedback of the channel information may also feed-back channel information respective to a specific number of RBs (i.e., SubBand (SB)).

Extended Antenna Configuration

Figure 5:
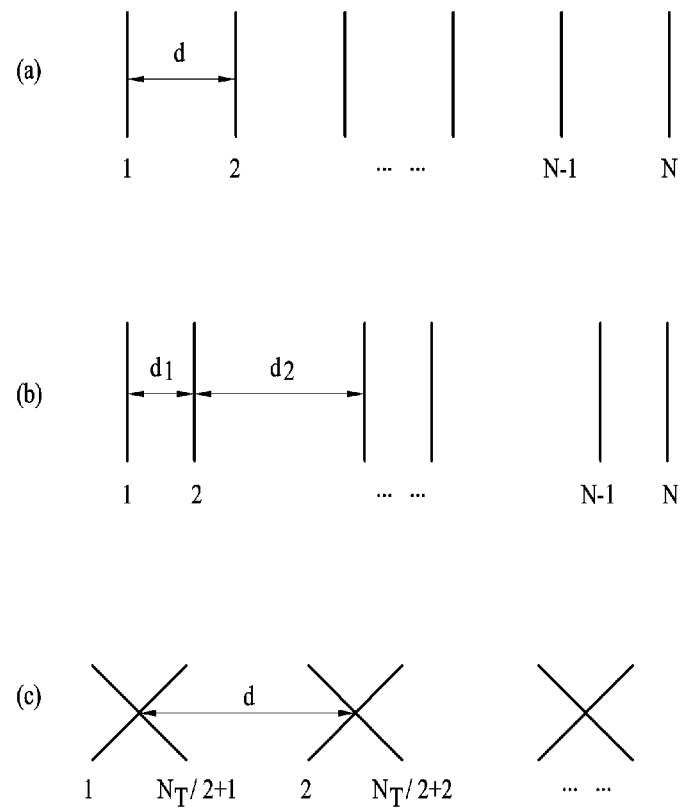
FIG. 5 illustrates examples for configuring 8 transmission antennae.

FIG. 5 illustrates examples for configuring 8 transmission antennae.

FIG. 5(a) illustrates a case when each of N number of antennae configures an independent channel without being grouped, and, this is generally referred to as ULA (Uniform Linear Array). As described above, by positioning multiple antennae to be spatially spaced apart from one another, the space of the transmitter and/or the receiver may not be sufficient for configuring independent channels.

FIG. 5(b) illustrates an antenna configuration of a ULA method, wherein two antennae form a pair (Paired ULA). In this case, a correlated channel is formed between the two antennae forming a pair, and this pair may have a channel that is independent from another pair of channels.

Meanwhile, as opposed to using 4 transmission antennae in a downlink in the legacy 3GPP LTE Release-8/9 system, in the 3GPP LTE Release-10 system, 8 transmission antennae may be used in a downlink. In order to apply such extended antenna configuration, since multiple transmission antennae are required to be installed in an insufficient space, the ULA antenna configuration shown in FIG. 5(a) and FIG. 5(b) may not be appropriate. Accordingly, a method of applying a dual-pole (or cross-pole) antenna configuration, as shown in FIG. 5(c), may be taken into consideration. In case of configuring the transmission antennae as described above, even if a distance d between the antennae becomes relatively shorter, by reducing the antenna correlation, high-yield data transmission may be performed.

Codebook Structures

As described above, by having the transmitting end and the receiving end share a pre-defined codebook, since an overhead that is required by the receiving end for feeding-back the precoding information, which is to be used for the MIMO transmission performed by the transmitting end, may be reduced, an efficient precoding may be applied.

As an example of configuring a pre-defined codebook, a precoder matrix may be configured by using a DFT (Discrete Fourier Transform) matrix or a Walsh matrix. Alternatively, diverse forms of precoders may be configured by being combined with a phase shift matrix or a phase shift diversity matrix.

In case of a co-polarization antenna group, DFT group codebooks have excellent performs, and, herein, in configuring a DFT matrix based codebook, a n×n matrix may be defined as shown below in Equation 16.

$$DFTn: D_n(k, \ell) = \frac{1}{\sqrt{n}} \exp(-j2\pi k\ell/n), \quad \text{[Equation 16]}$$
$$k, \ell = 0, 1, \ldots, n-1$$

With respect to a specific size n, only one matrix exists as the DFT matrix shown in Equation 16, which is presented above. Accordingly, in order to define various precoding matrices and to adequately use the defined matrices in accordance with the corresponding situation, a method of additionally configuring a rotated version of the DFTn matrix and using this rotated version may be taken into consideration. Equation 17 shown below represents an exemplary rotated DFTn matrix $$rotatedDFTn: D_n^{(G,g)}(k, \ell) = \frac{1}{\sqrt{n}} \exp(-j2\pi k(\ell + g/G)/n), \quad \text{Equation 17]}$$
$$k, \ell = 0, 1, \ldots, n-1, g = 0, 1, \ldots, G.$$

In case of configuring a DFT matrix as shown above in Equation 17, G number of rotated DFTn matrices may be generated, and the generated matrices satisfy DFT matrix properties.

Hereinafter, a Householder-based codebook structure will be described in detail. A Householder-based codebook structure refers to a codebook that is configured of householder matrices. A Householder matrix corresponds to a matrix that is used for a Householder Transform, and a Householder Transform corresponds to a type of linear transformation, which may be used for performing QR decomposition. QR decomposition refers to decomposing a matrix into an orthogonal matrix (Q) and an upper triangular matrix (R). An upper triangular matrix refers to a square matrix, wherein all entries (or elements) below the main diagonal entries are equal to 0. An example of a 4×4 Householder matrix is as shown below in Equation 18.

$$M_1 = I_4 - 2u_0 u_1^H / \|u_0\|^2 = \frac{1}{\sqrt{4}} * \begin{bmatrix} 1 & 1 & 1 & 1 \\ 1 & 1 & -1 & -1 \\ 1 & -1 & 1 & -1 \\ 1 & -1 & -1 & 1 \end{bmatrix}, \quad \text{[Equation 18]}$$

$$u_0^T = [1 \quad -1 \quad -1 \quad -1]$$

By performing the Householder Transform, a 4×4 unitary matrix having the CM property may be generated. As described above in the codebook for 4 transmission antennae shown in Table 2, n×n matrix is generated by using the Householder Transform, and the matrix may be configured to be used as a precoding matrix for a rank transmission lower than n by using a column subset of the generated precoding matrix.

Codebook for 8 Transmission Antennae

In a 3GPP LTE Release-10 system having an extended antenna configuration (e.g., 8 transmission antennae), the feedback method used in the legacy 3GPP LTE Release-8/9 system may be extended and applied. For example, Channel State Information (CSI), such as RI (Rank Indicator), PMI (Precoding Matrix Index), CQI (Channel Quality Information), and so on, may be fed-back. Hereinafter, a solution for designing a dual precoder based feedback codebook, which can be used in a system supporting the extended antenna configuration, will be described in detail. In the dual precoder based feedback codebook, in order to indicate a precoder that is to be used for the MIMO transmission of the transmitting end, the receiving end may transmit a precoding matrix index (PMI) to the transmitting end, and, herein, a precoding matrix may be indicated by a combination of two different PMIs. More specifically, the receiving end may feed-back to the transmitting end two different PMIs (i.e., a first PMI and a second PMI) to the transmitting end, and the transmitting end may decide a precoding matrix, which is indicated by the combination of the first PMI and the second PMI, and may then apply the decided precoding matrix to the MIMO transmission.

In designing the dual precoder based feedback codebook, 8 transmission antennae MIMO transmission, Single User-MIMO (SU-MIMO) and Multiple User-MIMO (MU-MIMO) support, suitability of diverse antennae configurations, codebook design standard, codebook size, and so on, may be taken into consideration.

As a codebook being applied to an 8 transmission antennae MIMO transmission, a method for designing a feedback codebook, which supports only SU-MIMO in case the transmission rank is greater than Rank 2, and which is optimized for both SU-MIMO and MU-MIMO in case the transmission rank is equal to or lower than Rank 2, and which is suitable (or adequate) for diverse antenna configurations may be taken into consideration.

With respect to MU-MIMO, it is preferable that the user equipments participating in the MU-MIMO are separated from one another in the correlation domain. Accordingly, a codebook for MU-MIMO is required to be designed to be correctly (or properly) operated in a channel having a high correlation. Since the DFT vectors provide satisfactory performance in channels having high correlation, it may be considered to include DFT vectors in a codebook group of up to Rank-2. Additionally, in a high scattering propagation environment (e.g., an indoor environment having a large amount of reflective waves, and so on), wherein a large number of spatial channels can be generated, SU-MIMO operations may be more appropriate as the MIMO transmission method. Therefore, a codebook for a rank higher than Rank-2 may be considered to be designed to have a satisfactory performance in separating multi-layers.

In designing a precoder for MIMO transmission, it will be preferable that one precoder structure is designed to have satisfactory performance with respect to various antenna configurations (low-correlation, high-correlation, Cross-polarization, and so on). In positioning the 8 transmission antennae, as a low-correlation antenna configuration, a Cross-polarization array having an antenna interval of 4λ may be configured, or, as a high-correlation configuration, a ULA having an antenna interval of 0.5λ may be configured, or, as a Cross-polarization antenna configuration, a Cross-polarization array having an antenna interval of 0.5λ may be configured. A DFT based codebook structure may provide satisfactory performance with respect to a high-correlation antenna configuration.

Meanwhile, with respect to the Cross-polarization antenna configuration, block diagonal matrices may be more adequate. Accordingly, in case a diagonal matrix is adopted to the codebook for 8 transmission antennae, a codebook providing satisfactory performance with respect to all antenna configurations may be configured.

As described above, the standard for a codebook design corresponds to satisfying a unitary codebook, a CM property, constrained alphabets, an adequate codebook size, a nested property, and so on. This has been applied to the 3GPP LTE Release-8/9 codebook design, and, it may also be considered to apply such codebook design standard with respect to the 3GPP LTE Release-10 codebook design, which supports an extended antenna configuration.

With respect to the codebook size, in order to sufficiently support the advantages of using 8 transmission antennae, it will be inevitable to increase the codebook size. In order to obtain sufficient precoding gain from the 8 transmission antennae in an environment having a low correlation, a large-sized codebook (e.g., a codebook exceeding the size of 4 bits with respect to Rank 1 and Rank 2) may be required. In an environment having a high correlation, in order to obtain precoding gain, a codebook having the size of 4 bits may be sufficient. However, in order to achieve multiplexing gain of MU-MIMO, the size of the codebook for Rank 1 and Rank 2 may be increased.

Based upon the description provided above, when the wireless communication system uses a transmit diversity system, the present invention proposes a method for performing feedback by effectively forming a group so that channels can be aligned along the same direction. The present invention is most particularly effective when the transmitter uses a massive antenna using an active antenna system (hereinafter referred to as AAS), and, as its main exemplary embodiment, this may be used in a downlink communication between the base station and the user equipment in a cellular network.

Figure 6:
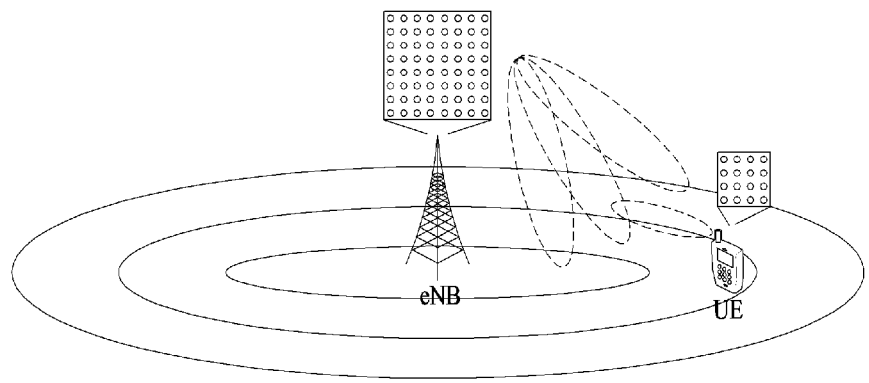
FIG. 6 illustrates an active antenna system (AAS).

FIG. 6 illustrates an active antenna system (AAS).

In wireless communication systems of LTE Rel-12 or following LTE Rel-12, the introduction of the active antenna system (AAS) is being considered. Unlike the conventional passive antenna system, wherein a passive circuit capable of adjusting the phase and size of a signal and an antenna are separated from one another, the AAS refers to a system having multiple antennae each configured of an active antenna including an active circuit.

Most particularly, as active antennae are used in the AAS, separate cable, connector, other hardware, and so on, for connecting the active circuit to the antenna are not required, and, accordingly, the AAS in highly efficient in the aspects of energy and operation cost. Additionally, since the AAS supports an electronic beam control method for each antenna, a more evolved MIMO technology, which is capable of forming elaborate beam patterns or 3-dimensional (3D) beam patterns, and so on, based upon beam directions and beam widths, may be realized.

With the introduction of such evolved antenna systems, such as AAS, a massive MIMO structure having multiple input/output antennae and multi-dimensional antenna structures is also being considered. For example, unlike the conventional linear antenna array (or alignment), in case of forming a 2-dimensional antenna array, in accordance with the active antennae of the AAS, a 3-dimensional beam pattern may be formed.

Therefore, for the base station, in case of using a 3-dimensional beam pattern, sector formation along a horizontal direction of the beam as well as a vertical direction of the beam may be considered. Moreover, for the user equipment, when forming a reception beam by using a massive reception antenna, a signal power elevation effect respective to the antenna array gain may be expected. And, accordingly, it will be advantageous in that the performance requirements of the system may be satisfies by merely using a power level lower than that of the conventional system and method.

Hereinafter, based upon the description presented above, a method of designing a codebook for a vertical antenna or a codebook for a horizontal antenna, which is proposed in the present invention, in order to perform beamforming so as to allow a transmitting end having vertical antenna elements or a transmitting end having horizontal antenna elements deliver a signal having a large amount of antenna gain to a specific receiving end, will be described in detail.

In the related art wireless communication system, the antennae were configured to have antenna elements installed along a horizontal direction, and horizontal antenna beams were mostly considered. Accordingly, in order to send out data of high signals to the receiving end, beamforming was generally performed along a horizontal direction. However, the introduction of a technology considering antenna elements that are installed in the transmitting end along a vertical direction as well as vertical antenna beams is current being taken into consideration, and due to such introduction, expectations in higher transmission gain may be anticipated.

Figure 7:
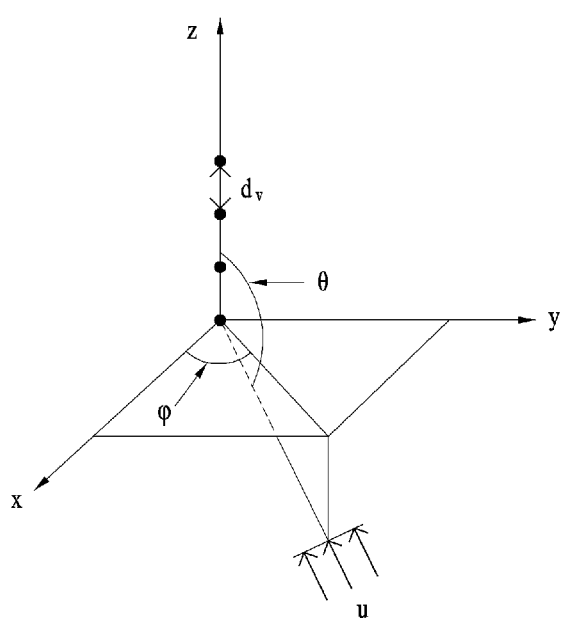
FIG. 7 illustrates exemplary antenna elements of horizontal/vertical directions.

FIG. 7 illustrates a referential view for describing an antenna element having the present invention applied thereto.

In the present invention, as shown in FIG. 7, it is assumed that an antenna having antenna elements respective to a vertical direction (or antenna elements respective to a horizontal direction) installed in a portion of the transmitting end or in the entire transmitting end is used. In FIG. 7, 4 antenna elements are spaced apart from one another at an interval of $d_v$ along the vertical direction. At this point, an azimuth angle $\phi$ and an elevation angle $\theta$ decide a direction of an antenna beam, which faces position u in FIG. 7. An element of channel V, which is configured of a phase difference caused by path differences in the antenna elements, may be expressed as shown below in Equation 19.

$$v_m(\theta,\phi) = \exp(2\pi \cdot j \cdot (m-1) \cdot d_v \cdot \cos(\theta)/\lambda) \quad \text{[Equation 19]}$$

In Equation 19, m=1,2, ... M (wherein M corresponds to a number of antenna elements for beamforming along vertical/horizontal directions). In Equation 19, $\lambda$ signifies a wavelength of a radio wave. In Equation 19, a cos $\theta$ part may be expressed as one of 4 expressions, such as $\pm\cos \theta$ or $\pm\sin \theta$, in accordance with angle configuration with a starting point along the vertical direction (or horizontal direction) in the antenna array.

At this point, a codebook for a precoding vector may be selected as one column or several columns from a matrix essentially having a DFT matrix. A general DFT matrix that is being considered at the point is as shown below in Equation 20.

$$D_{(mn)}^{M \times Ma} = \frac{1}{\sqrt{M}} e^{j\frac{2\pi(m-1)(n-1)}{Ma}} \quad \text{[Equation 20]}$$

wherein, $$m = 1, 2, \ldots, M, n = 1, 2, \ldots, M \cdot a$$

In Equation 20, (mn) signifies an element of (m,n) in matrix D, and a signifies an oversampling factor.

Hereinafter, after describing a codebook assuming rank 1 (i.e., a case when 1 layer exists), which is proposed in the present invention, an exemplary extended application for a codebook based upon a rank that is higher than rank 1 will be described in detail. Accordingly, for the Rank 1 codebook, if a codeword is selected from Equation 20, a method of limiting (or restricting) elements of the DFT matrix of Equation 20 is proposed.

Essentially, the columns of matrix D of Equation 20 have the characteristics of having the elements within one column be increased linearly. Accordingly, in matrix D, in a $n^{th}$ column, the phase of the elements is incremented (or increased) by $$\frac{2\pi(n-1)}{Ma}.$$

Such increase is quantized as much as a value of Ma between 0~$2\pi$, thereby being shared by each column. Such phase increase is defined as $\Delta P$.

Based upon the description presented above, in the present invention, when the columns of the DFT matrix configure the entire codebook, or configure a portion of the codebook, there may be limitations in the phase increase of each column.

Therefore, in the present invention, elements of the precoding vector W will first be defined as shown below.

$$\omega_m = \frac{1}{\sqrt{M}} \exp(-j \cdot (m-1) \cdot \theta_{beam}), m = 1, 2, \ldots M \quad \text{[Equation 21]}$$

Equation 21 shows a case when the precoding vector corresponds to one of the columns included in the DFT matrix. Accordingly, in the DFT matrix of Equation 20, in case the $n^{th}$ column corresponds to the precoding vector, a value of $\theta_{beam}$ becomes equal to $$\frac{2\pi(n-1)}{Ma},$$

and this value may signify the phase increase $\Delta P$. Based upon the above-described precoding vector, a total antenna gain G may be expressed as shown below in Equation 22 by using Equation 19 and Equation 21.

$$G = 10\log_{10}\left[\left|\sum_{m=1}^{M} \omega_m \cdot v_m\right|^2\right] \quad \text{[Equation 22]}$$

In the above-described Equation 22, G may be viewed as a total antenna gain that is obtained by gathering (or collecting) M number of antenna elements. In order to maximize such antenna gain pattern, $$\left|\sum_{m=1}^{M} \omega_m \cdot v_m\right|^2$$

shall be maximized in Equation 22, and, at this point, in the precoding vector $\omega_m$, the $\theta_{beam}$ shall be set as $$\frac{2\pi d_v}{\lambda}\cos\theta$$

of Equation 19. Accordingly, if the $\theta_{beam}$ is accurately set to $$\frac{2\pi d_v}{\lambda}\cos\theta,$$

the antenna gain is set to a multiple of M.

In this case, a value range of $$\Delta phase = \frac{2\pi d_v}{\lambda}\cos\theta,$$

which corresponds to a value of the phase different caused by the path differences in Equation 19, may be adjusted. More specifically, this is because the range of the value of the phase difference (Δphase) determines the value range of $\theta_{beam}$. When it is assumed that the value of $d_v$ is equal to 0.5λ, and when it is assumed that the range of θ is 0°≤θ≤180°, the range of the value of the phase difference (Δphase) may be determined as −π≤Δphase≤π.

Therefore, since the value of $\theta_{beam}$ can cover the entire range, there is no need to limit the value of $\theta_{beam}$ bin the present invention. Nevertheless, in a Macro cell, provided that is can be assumed that the transmitting end (e.g., base station) is located at a position that is higher than the receiving ends (e.g., user equipments), even if the range of the value θ is broadly determined in FIG. 7, it will be sufficient to determine the range as 90°≤θ≤180°, and, accordingly, the range of the Δphase value shall become −π≤Δphase≤0.

Therefore, when creating the DFT codebook, instead of quantizing the phase increase as much as the Ma value between 0~2π, the phase increase may be quantized as much as the Ma value between −π~0. Accordingly, by quantizing a smaller range, since codewords more closely aligned (or positioned) (with a specific range) may be generated (or created) by using the same quantization bit, the system performance may be enhanced.

Figure 8:
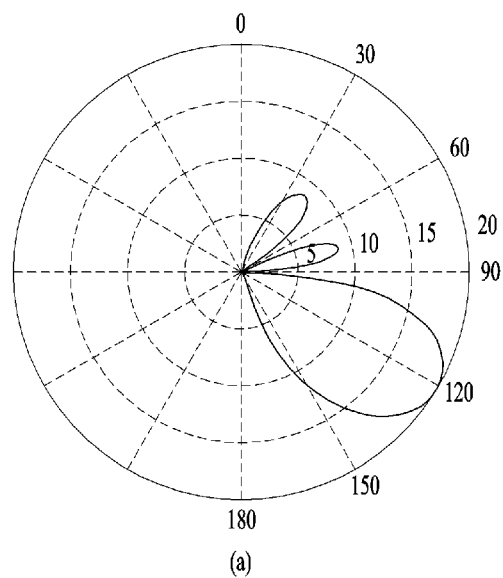
FIG. 8 illustrates a referential view of a case of adjusting beamforming according to the present invention.
Figure 8:
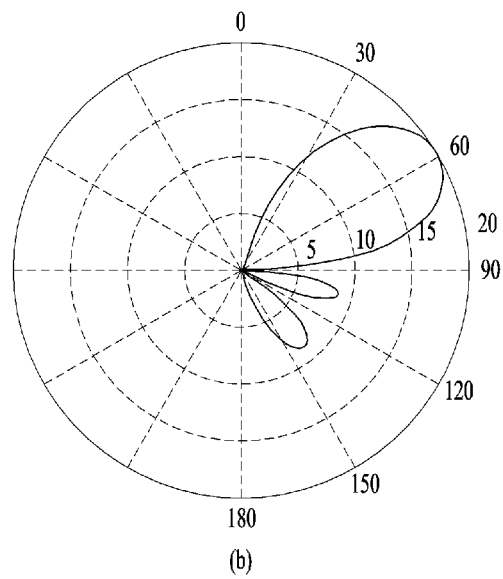

FIG. 8 illustrates a referential view of a case of adjusting beamforming according to the present invention.

When the beam direction of a main lobe according to the present invention is intended to be set to 120°, in order to maximize the direction of the beam having a path difference of $$\Delta phase = \frac{2\pi d_v}{\lambda}\cos\left(\frac{2\pi}{3}\right) = -\frac{\pi}{2},$$

FIG. 8(a) illustrates a case when the $\theta_{beam}$ is set to $$-\frac{\pi}{2}.$$

However, if the $\theta_{beam}$ is set to $$\frac{\pi}{2},$$

the main beam shall indicate 60°, as shown in FIG. 8(b), and, as described above, this indicates that, in a situation when the range of the θ value has a range of 90°≤θ≤180°, setting is not required to be made. Therefore, in a situation when the range of the θ value has a range of 90°≤θ≤180°, a codeword having $$\frac{\pi}{2}$$

as its phase increase becomes unnecessary.

Accordingly, in the present invention, in some case, when α≤θ≤β is being required, it is proposed that $\theta_{beam}$ is to be limited as shown below when designing the DFT codebook. In Equation 23 to Equation 30 shown below, since the cos θ part can be alternately expressed as ±cos θ or ±sin θ in accordance with angle configuration with a starting point along the horizontal direction in the antenna array, each case has been separately expressed.

$$\frac{2\pi d_v}{\lambda}\min(\cos\alpha) \le \Delta P \le \frac{2\pi d_v}{\lambda}\max(\cos\beta) \qquad \text{[Equaiton 23]}$$

$$\frac{2\pi d_v}{\lambda}\min(-\cos\alpha) \le \Delta P \le \frac{2\pi d_v}{\lambda}\max(-\cos\beta) \qquad \text{[Equaiton 24]}$$

$$\frac{2\pi d_v}{\lambda}\min(\sin\alpha) \le \Delta P \le \frac{2\pi d_v}{\lambda}\max(\sin\beta) \qquad \text{[Equaiton 25]}$$

$$\frac{2\pi d_v}{\lambda}\min(-\sin\alpha) \le \Delta P \le \frac{2\pi d_v}{\lambda}\max(-\sin\beta) \qquad \text{[Equaiton 26]}$$

More specifically, since θ is set within a predetermined range, in case of applying a case when the cos θ part corresponds to cos α (or sin α), when θ is equal to α, and, in case of applying a case when the cos θ part corresponds to cos β (or sin β), when θ is equal to β, $$\frac{2\pi d_v}{\lambda}\min(\cos\alpha,\cos\beta) \le \Delta P \le \frac{2\pi d_v}{\lambda}\max(\cos\alpha,\cos\beta) \qquad \text{[Equaiton 27]}$$

$$\frac{2\pi d_v}{\lambda}\min(-\cos\alpha,-\cos\beta) \le \Delta P \le \frac{2\pi d_v}{\lambda}\max(-\cos\alpha,-\cos\beta) \qquad \text{[Equaiton 28]}$$

$$\frac{2\pi d_v}{\lambda}\min(\sin\alpha,\sin\beta) \le \Delta P \le \frac{2\pi d_v}{\lambda}\max(\sin\alpha,\sin\beta) \qquad \text{[Equaiton 29]}$$

$$\frac{2\pi d_v}{\lambda}\min(-\sin\alpha, -\sin\beta) \leq \Delta P \leq \frac{2\pi d_v}{\lambda}\max(-\sin\alpha, -\sin\beta) \quad \text{[Equation 30]}$$

In Equation 23 to Equation 30, when there are limitations (or restrictions) in the phase increase $\Delta P$, the $\Delta P$ may be expressed as shown in Equation 31.

$$\gamma \leq \Delta P \leq \delta \quad \text{[Equation 31]}$$

Accordingly, in the present invention, if a $\delta-\gamma$ value is greater than $2\pi$, we may design the DFT codebook by using Equation 20, as in the conventional method. However, if the $\delta-\gamma$ value is smaller than $2\pi$, the DFT codebook may be defined as shown below in Equation 32.

$$D_{(mn)}^{M \times Ma} = \frac{1}{\sqrt{M}} \exp\left(j\left\{\gamma(m-1) + \frac{(\delta-\gamma)(m-1)(n-1)}{Ma}\right\}\right), \quad \text{[Equation 32]}$$

wherein $m = 1, 2, \ldots, M, n = 1, 2, \ldots, M \cdot a$

In the codebook that is designed as shown in Equation 32, since unnecessary codewords are not used, the system performance may be enhanced.

In the present invention, as described above, although the phase increase $\Delta P$ can be limited (or restricted) by using the DFT matrix, the phase increase $\Delta P$ may be limited by directly defining the $\theta_{beam}$, as shown in Equation 21. This is because the $\Delta P$ performs the same function as the $\theta_{beam}$. Accordingly, the $\theta_{beam}$ may be defined as shown below in Equation 33.

$$\theta_{beam} \in \{\theta_i\}, \text{ wherein } i=1,2,\ldots,2^L \quad \text{[Equation 33]}$$

In Equation 33, L indicates a bit value that is assigned to the $\theta_{beam}$. In Equation 33, when the limitations respective to Equation 31 is applied, $\theta_i$ of Equation 33 may be defined as shown below in Equation 34.

$$\theta_i = \gamma + \frac{(\delta-\gamma)(i-1)}{2^L}, \text{ wherein } i = 1, 2, \ldots, 2^L \quad \text{[Equation 34]}$$

As described above, although the precoding vector W respective to the vertical direction is being described under the assumption of Equation 21, a precoding vector respective to Equation 35 may also be considered.

$$\omega_m = \frac{1}{\sqrt{M}} \exp(-2\pi \cdot j \cdot (m-1) \cdot d_v \cdot \cos(\theta_{beam2})/\lambda) \quad \text{[Equation 35]}$$

$$m = 1, 2, \ldots M$$

In Equation 19, since a $\cos\theta$ part may be expressed as one of 4 expressions, such as $\pm\cos\theta$ or $\pm\sin\theta$, in accordance with angle configuration with a starting point along the vertical direction (or horizontal direction) in the antenna array, accordingly, $\cos(\theta_{beam2})$ may be expressed in 4 expressions, such as $\pm\cos(\theta_{beam2})$ or $\pm\sin(\theta_{beam2})$. In case of using the precoding shown in Equation 35, $\theta_{beam2}$ may be designed as shown in Equation 36.

$$\theta_{beam2} \in \{\theta_i\}, \text{ wherein } i=1,2,\ldots,2^L \quad \text{[Equation 36]}$$

In Equation 36, L signifies a bit value that is assigned to $\theta_{beam2}$. Accordingly, based upon the above-described precoding vector in the Equation, a total antenna gain G may be expressed as shown below in Equation 37 by using Equation 19 and Equation 35.

$$G = 10\log_{10}\left[\cdot\left|\sum_{m=1}^{M} w_m \cdot v_m\right|^2\right] \quad \text{[Equation 37]}$$

In order to maximize such antenna gain pattern, $$\left|\sum_{m=1}^{M} w_m \cdot v_m\right|^2$$

is required to be maximized in Equation 37, and, at this point, in the precoding vector $\omega_m$, $\theta_{beam2}$ may become $\theta$ of Equation 19. Accordingly, if $\theta_{beam2}$ is accurately set to $\theta$, the antenna gain may become a multiple of M.

In this case, even in case there is no condition of $\alpha \leq \theta \leq \beta$, the value of $\theta_{beam2}$ may be required to be limited (or restricted). For example, when it is assumed that the value of $d_v$ is equal to $4\lambda$, and when it is assumed that there are no limitations in the range of $\theta$, the range of the value of $\Delta$phase shall become $-8\pi \leq \Delta\text{phase} \leq 8\pi$. At this point, if the range of the value of $\theta_{beam2}$ is set to $0 \leq \theta_{beam2} \leq 2\pi$, the phase increase of the precoding vector in Equation 35 becomes $$-\frac{2\pi d_v}{\lambda}\cos\theta_{beam2},$$

and the range of this value shall be $$-8\pi \leq -\frac{2\pi d_v}{\lambda}\cos\theta_{beam2} \leq 8\pi.$$

More specifically, even though the values of $-8\pi \sim -\pi$ and the values of $\pi \sim 8\pi$ can be replaced with the values of $-\pi \sim \pi$, the codeword may be separately generated (or created). Accordingly, the value of $\theta_{beam2}$ is required to be limited (or restricted) as shown below in Equation 38.

$$\cos^{-1}\left(\frac{\lambda}{2d_v}\right) \leq \theta_{beam2} \leq \cos^{-1}\left(-\frac{\lambda}{2d_v}\right) \quad \text{[Equation 38]}$$

In Equation 38, the values of $$\cos^{-1}\left(-\frac{\lambda}{2d_v}\right)$$

and $$\cos^{-1}\left(\frac{\lambda}{2d_v}\right)$$

are selected from $0 \sim \pi$.

Furthermore, in Equation 38, when the following definitions are made, $$f = \cos^{-1}\left(\frac{\lambda}{2d_v}\right), \quad g = \cos^{-1}\left(-\frac{\lambda}{2d_v}\right), \quad \theta_i$$

of Equation 36 may be defined as shown below in Equation 39.

$$\theta_i = f + \frac{(g-f)(i-1)}{2^L}, \text{ wherein } i = 1, 2, \ldots, 2^L \quad \text{[Equation 39]}$$

Moreover, in the present invention, in some cases, when $\alpha \leq \theta \leq \beta$ is being required, when designing $\{\theta_i\}$, $\theta_{beam2}$ may be limited (or restricted) as shown below in Equation 40.

$$\alpha \leq \theta_{beam2} \leq \beta \quad \text{[Equation 40]}$$

Accordingly, in the present invention, when the $\beta-\alpha$ value is greater than $\pi$ in Equation 40, Equation 39 shall be used. However, if the $\beta-\alpha$ value is smaller than $\pi$, $\theta_i$ of Equation 36 shall be designed as shown below in Equation 41.

$$\theta_i = \alpha + \frac{(\beta-\alpha)(i-1)}{2^L}, \text{ wherein } i = 1, 2, \ldots, 2^L \quad \text{[Equation 41]}$$

Additionally, in the present invention, Equation 32, Equation 34, and Equation 41 may limit (or restrict) the beam to a corrected form as shown below in Equations 42 to 44.

$$D_{(mn)}^{M \times Ma} = \frac{1}{\sqrt{M}} \exp\left(j\left\{(m-1)\gamma + \frac{2\pi(m-1)(n-1)}{\text{Map}_1}\right\}\right), \quad \text{[Equation 42]}$$

wherein $m = 1, 2, \ldots, M, \quad n = 1, 2, \ldots M \cdot a$ $$\theta_i = \gamma + \frac{2\pi(i-1)}{2^L p_1}, \text{ wherein } i = 1, 2, \ldots, 2^L \quad \text{[Equation 43]}$$

$$\theta_i = \alpha + \frac{2\pi(i-1)}{2^L p_2}, \text{ wherein } i = 1, 2, \ldots, 2^L \quad \text{[Equation 44]}$$

When Equation 42 is defined as a corrected equation of Equation 32, which corresponds to $$p_1 = \frac{2\pi}{\delta - \gamma},$$

the two equations are shown to be identical to one another. Similarly, when Equation 43 is defined as a corrected equation of Equation 34, which corresponds to $$p_1 = \frac{2\pi}{\delta - \gamma},$$

the two equations are shown to be identical to one another. Furthermore, when Equation 44 is defined as a corrected equation of Equation 41, which corresponds to $$p_2 = \frac{2\pi}{\beta - \alpha},$$

the two equations are shown to be identical to one another.

Presented above is a description on a codebook using columns of a DFT matrix that is proposed in the present invention. In other words, when the range of the main beam is $\alpha \leq \theta \leq \beta$, in the description provided above, the codebook has been designed so that the phase increase or the $\theta_i$ value can be evenly (or equally) divided within the determined range. Hereinafter, a case when the phase increase or the $\theta_i$ value is unevenly divided within the determined range of the main beam will be described in detail.

Figure 9:
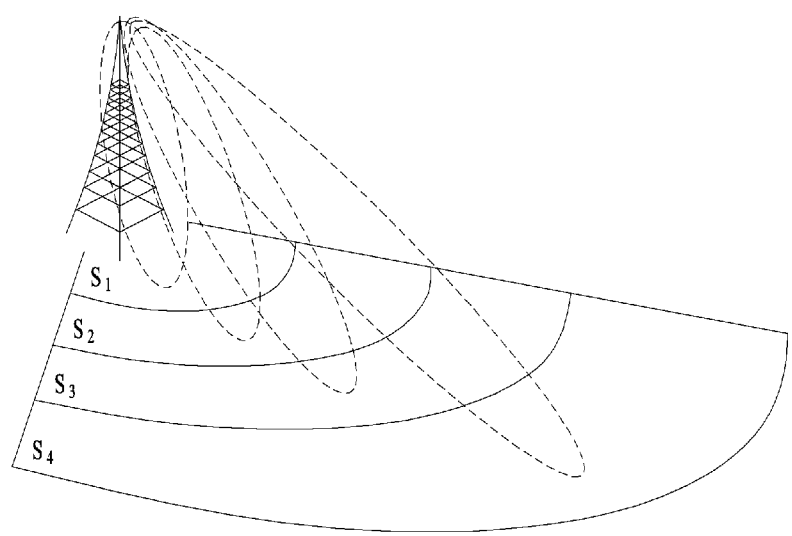
FIG. 9 illustrates a referential view of an application example of the present invention respective to a case of 4 main beams.

FIG. 9 illustrates a referential view showing a case of having 4 main beams generated by a codebook of 2 bits. In FIG. 9, each of the main beams is set (or configured) to respectively cover regions $s_1, s_2, s_3, s_4$. At this point, depending upon how $s_1, s_2, s_3, s_4$ are designed, the phase increase or the $\theta_i$ value may be unevenly divided. Essentially, $s_1, s_2, s_3, s_4$ may be designed to have the same surface area, and, in this case, the phase increase of the $\theta_i$ value may not have even (or equal) values.

First of all, a method of designing such uneven phase increase or $\theta_i$ value in the present invention will hereinafter be described in detail. First of all, it will be assumed that the size of the codebook is equal to L bits. At this point, a surface area that is covered by the main beam, which is generated by $2^L$ number of codewords, is defined as $s_i$. At this point, a group of $\theta$ (i.e., Equation 19), wherein each of the main beams respectively faces the center of $s_i$, is defined as $\Theta = \{\phi_1, \phi_2, \ldots, \phi_{2^L}\}$. When the range of the main beam is $\alpha \leq \theta \leq \beta$, it will be assumed that each of the transmitting/receiving ends is informed in advance of a method of designing $\Theta = \{\phi_1, \phi_2, \ldots, \phi_{2^L}\}$.

Under this assumption, in case of applying Equation 21 for precoding, the codebook of $\theta_{beam}$ may be designed as $$\left\{2\pi \cdot \frac{d_v}{\gamma} \cdot \cos\varphi_i\right\},$$

and the codebook of $\theta_{beam}$ may be expressed as shown below in Equation 45.

$$\theta_{beam} \in \left\{2\pi \cdot \frac{d_v}{\lambda} \cdot \cos\varphi_i\right\} \quad \text{[Equation 45]}$$

In Equation 45, as a similar variation of the cos θ part, which is variably expressed as ±cos θ or ±sin θ in accordance with angle configuration with a starting point along the vertical direction (or horizontal direction) in the antenna array, in Equation 19, in Equation 45, a $\cos\phi_i$ part may be variably expressed as $\pm\cos\phi_i$ or $\pm\sin\phi_i$.

In case of applying Equation 35 for precoding, the codebook of $\theta_{beam2}$ may design as $\{\cos\phi_i\}$, which allows each of the main beams within the main beam range of $\alpha \leq \theta_{beam2} \leq \beta$ to respectively face the center of each $s_i$, and the codebook of $\theta_{beam}$ may be expressed as shown below in Equation 46.

$$\theta_{beam} \in \{\cos\phi_i\} \quad \text{[Equation 46]}$$

In Equation 46, as a similar variation of the cos θ part, which is variably expressed as ±cos θ or ±sin θ in accordance with angle configuration with a starting point along the vertical direction (or horizontal direction) in the antenna array, in Equation 19, in Equation 45, a cos $\phi_i$ part may be variably expressed as ±cos $\phi_i$ or ±sin $\phi_i$.

In the description presented above, restrictions on the elements in a DFT matrix of a codebook for 1 layer (1 rank) have been proposed. Hereinafter, a case when the 1 rank system according to the present invention is extended to a codebook having a higher rank will hereinafter be described in detail.

For simplicity in the description, in accordance with one of the codebooks shown in Equation 32 or Equation 42, $\Delta^{\{1\}}$ will be assumed as a codebook for rank 1, which is created with restricted main beams (i.e., in case of rank r, the codebook will be defined as $\Delta^{\{r\}}$). At this point, one codeword is defined as $d_n^{\{1\}}$, as shown below in Equation 47 (i.e., in case of) r, the codewords will be defined as $d_n^{\{r\}}$).

$$d_n^{\{1\}} = \frac{1}{\sqrt{M}} [e^{j\phi_{1,n}}\ e^{j\phi_{2,n}}\ \ldots\ e^{j\phi_{M,n}}]^T \qquad \text{[Equation 47]}$$

At this point, the codeword of a rank 2 codebook may be defined as shown below in Equation 48.

$$d_n^{\{2\}} = \frac{1}{\sqrt{2M}} \begin{bmatrix} e^{j\phi_{1,n}} & e^{j\phi_{1,n}} \\ e^{j\phi_{2,n}} & e^{j\phi_{2,n}} e^{j\frac{2k_1\pi}{M}} \\ \vdots & \vdots \\ e^{j\phi_{M,n}} & e^{j\phi_{M,n}} e^{j\frac{2(M-1)k_1\pi}{M}} \end{bmatrix} \qquad \text{[Equation 48]}$$

In Equation 48, the value of $k_1$ is set to one of the values among $\{1,2,\ldots,M-1\}$. When configuring the value of $k_1$, in order to set this value only with the values that exist within the range of the Main beam, $k_1$ is selected so as to match with the range of the phase increase $\gamma \leq \Delta P \leq \delta$ shown in Equation 31. If a $k_1$ value meeting with this condition (or requirement) does not exist, a Rank 2 codebook is not designed. In Equation 48, it may be easily known that two columns are orthogonal. By using this method, a codeword of a rank r codebook may be defined as shown below in Equation 49.

$$d_n^{\{r\}} = \frac{1}{\sqrt{rM}} \begin{bmatrix} e^{j\phi_{1,n}} & e^{j\phi_{1,n}} & e^{j\phi_{1,n}} & \ldots & e^{j\phi_{1,n}} \\ e^{j\phi_{2,n}} & e^{j\phi_{2,n}} e^{j\frac{2k_1\pi}{M}} & e^{j\phi_{2,n}} e^{j\frac{2k_2\pi}{M}} & \ldots & e^{j\phi_{2,n}} e^{j\frac{2k_{r-1}\pi}{M}} \\ e^{j\phi_{3,n}} & e^{j\phi_{3,n}} e^{j\frac{4k_1\pi}{M}} & e^{j\phi_{3,n}} e^{j\frac{4k_2\pi}{M}} & \ldots & e^{j\phi_{3,n}} e^{j\frac{4k_{r-1}\pi}{M}} \\ \vdots & \vdots & \vdots & \ddots & \vdots \\ e^{j\phi_{M,n}} & e^{j\phi_{M,n}} e^{j\frac{2(M-1)k_1\pi}{M}} & e^{j\phi_{M,n}} e^{j\frac{2(M-1)k_2\pi}{M}} & \ldots & e^{j\phi_{M,n}} e^{j\frac{2(M-1)k_{r-1}\pi}{M}} \end{bmatrix} \qquad \text{[Equation 49]}$$

In Equation 49, although the values of $k_1, k_2, \ldots, k_{r-1}$ may each be assigned with a different value, each value may be assigned with one of $1,2,\ldots,M-1$. In case of a full rank, wherein r=M, each of the $k_1, k_2, \ldots, k_{r-1}$ values may be respectively assigned with a value from $1,2,\ldots,M-1$.

Additionally, when configuring the values of $k_1, k_2, \ldots, k_{r-1}$, in order to set this value only with the values that exist within the range of the Main beam, each of $k_1, k_2, \ldots, k_{r-1}$ may be selected so as to match with the range of the phase increase $\gamma \leq \Delta P \leq \delta$ shown in Equation 31. If only a $Nr_{max}$ number of $k_1$ values meeting with this condition (or requirement) exist, codebooks only up to Rank $Nr_{max}$ codebook are designed. For example, in case r=M=4, values of $k_1=1, k_2=3, k_3=2$ may be assigned for a Rank 3 codebook. However, in case $k_1$ and $k_2$ create a restricted main beam that satisfies Equation 31, and in case $k_3$ deviates from the range of the main beam, which is restricted in accordance with Equation 31, it may be assumed that codebooks only up to Rank 2 codebook can be transmitted/received.

A case when the rank is extended by using Equation 34 or Equation 43 will hereinafter be described in detail. At this point, when values of $\theta_{beam}$ each having an r-rank are given as $\{\theta_i^{\{1\}}, \theta_i^{\{2\}}, \ldots, \theta_i^{\{r\}}\}$, by using the same method as Equation 49, the values of $\{\theta_i^{\{1\}}, \theta_i^{\{2\}}, \ldots, \theta_i^{\{r\}}\}$ may be expressed for each rank with respect to i, as shown below in Equation 50.

$$\{\theta_i^{\{1\}}, \theta_i^{\{2\}}, \theta_i^{\{3\}}, \ldots, \theta_i^{\{r\}}\} = \qquad \text{[Equation 50]}$$
$$\left\{\theta_i^{\{1\}}\ \theta_i^{\{1\}} + \frac{2k_1\pi}{M}\ \theta_i^{\{1\}} + \frac{2k_2\pi}{M}\ \ldots\ \theta_i^{\{1\}} + \frac{2k_{(M-1)}\pi}{M}\right\}$$

In Equation 50, values $\theta_i^{\{1\}}$ that are respective to i have already been described above in Equation 34 or Equation 43. Additionally, although the values of $k_1, k_2, \ldots, k_{r-1}$ may each be assigned with a different value, each value may be assigned with one of $1,2,\ldots,M-1$. In case of a full rank, wherein r=M, each of the $k_1, k_2, \ldots, k_{r-1}$ values may be respectively assigned with a value from $1,2,\ldots,M-1$. Additionally, when configuring the values of $k_1, k_2, \ldots, k_{r-1}$, in order to set this value only with the values that exist within the range of the Main beam, each of $k_1, k_2, \ldots, k_{r-1}$ may be selected so as to match with the range of the phase increase $\gamma \leq \Delta P \leq \delta$ shown in Equation 31. If only a $Nr_{max}$ number of $k_1$ values meeting with this condition (or requirement) exist, codebooks only up to Rank $Nr_{max}$ codebook are designed.

A case when the rank is extended by using one of Equations 39, 41, and 44 will hereinafter be described in detail. At this point, when values of $\theta_{beam2}$ each having an r-rank are given as $\{\theta_i^{\{1\}}, \theta_i^{\{2\}}, \ldots, \theta_i^{\{r\}}\}$, by using the same method as Equation 49, the values of $\{\theta_i^{\{1\}}, \theta_i^{\{2\}}, \ldots, \theta_i^{\{r\}}\}$ may be expressed for each rank with respect to i, as shown below in Equation 51.

$$\{\theta_i^{\{1\}}, \theta_i^{\{2\}}, \theta_i^{\{3\}}, \ldots, \theta_i^{\{r\}}\} = \qquad \text{[Equation 51]}$$
$$\left\{\theta_i^{\{1\}}\ \theta_i^{\{1\}} + \frac{2k_1\pi}{M}\ \theta_i^{\{1\}} + \frac{2k_2\pi}{M}\ \ldots\ \theta_i^{\{1\}} + \frac{2k_{(M-1)}\pi}{M}\right\}$$

In Equation 51, values $\theta_i^{\{1\}}$ that are respective to i are shown in Equation 39, Equation 41, or Equation 44. Additionally, although the values of $k_1, k_2, \ldots, k_{r-1}$ may each be assigned with a different value, each value may be assigned with one of $1,2,\ldots,M-1$. In case of a full rank, wherein r=M, each of the $k_1, k_2, \ldots, k_{r-1}$ values may be respectively assigned with a value from $1,2,\ldots,M-1$. When configuring the values of $k_1, k_2, \ldots, k_{r-1}$, in order to set this value only with the values that exist within the range of the Main beam, each of $k_1, k_2, \ldots, k_{r-1}$ is selected so as to match with the range of the main beam $\alpha \leq \theta_{beam2} \leq \beta$ according to Equation 40. If only a $Nr_{max}$ number of $k_1$ values meeting with this condition (or requirement) exist, codebooks only up to Rank $Nr_{max}$ codebook are designed.

A case when the rank is extended by using Equation 45 will hereinafter be described in detail. At this point, when values of $\theta_{beam}$ each having an r-rank are given as $\{\theta_i^{\{1\}}, \theta_i^{\{2\}}, \ldots, \theta_i^{\{r\}}\}$, by using the same method as Equation 49, the values of $\{\theta_i^{\{1\}}, \theta_i^{\{2\}}, \ldots, \theta_i^{\{r\}}\}$ may be expressed for each rank with respect to i, as shown below in Equation 52.

$$\{\theta_i^{\{1\}}, \theta_i^{\{2\}}, \theta_i^{\{3\}}, \ldots, \theta_i^{\{r\}}\} = \qquad \text{[Equation 52]}$$
$$\left\{\theta_i^{\{1\}} \; \theta_i^{\{1\}} + \frac{2k_1\pi}{M} \; \theta_i^{\{1\}} + \frac{2k_2\pi}{M} \; \ldots \; \theta_i^{\{1\}} + \frac{2k_{(M-1)}\pi}{M}\right\}$$

In Equation 52, values $\theta_i^{\{1\}}$ that are respective to i are shown in Equation 45. Additionally, although the values of $k_1, k_2, \ldots, k_{r-1}$ may each be assigned with a different value, each value may be assigned with one of $1,2,\ldots,M-1$. In case of a full rank, wherein r=M, each of the $k_1, k_2, \ldots, k_{r-1}$ values may be respectively assigned with a value from $1,2,\ldots,M-1$. When configuring the values of $k_1, k_2, \ldots, k_{r-1}$, in order to set this value only with the values that exist within the range of the Main beam, each of $k_1, k_2, \ldots, k_{r-1}$ is selected so as to match with the range of the main beam $\alpha \leq \theta \leq \beta$. If only a $Nr_{max}$ number of $k_1$ values meeting with this condition (or requirement) exist, codebooks only up to Rank $Nr_{max}$ codebook are designed.

A case when the rank is extended by using Equation 46 will hereinafter be described in detail. At this point, when values of $\theta_{beam2}$ each having an r-rank are given as $\{\theta_i^{\{1\}}, \theta_i^{\{2\}}, \ldots, \theta_i^{\{r\}}\}$, by using the same method as Equation 49, the values of $\{\theta_i^{\{1\}}, \theta_i^{\{2\}}, \ldots, \theta_i^{\{r\}}\}$ may be expressed for each rank with respect to i, as shown below in Equation 53.

$$\{\theta_1^{\{1\}}, \theta_1^{\{2\}}, \theta_1^{\{3\}}, \ldots, \theta_1^{\{r\}}\} = \qquad \text{[Equation 53]}$$
$$\left\{\theta_i^{\{1\}} \; \theta_i^{\{1\}} + \frac{2k_1\pi}{M} \; \theta_i^{\{1\}} + \frac{2k_2\pi}{M} \; \ldots \; \theta_i^{\{1\}} + \frac{2k_{(M-1)}\pi}{M}\right\}$$

In Equation 51, values $\theta_i^{\{1\}}$ that are respective to i are shown in Equation 46. Additionally, although the values of $k_1, k_2, \ldots, k_{r-1}$ may each be assigned with a different value, each value may be assigned with one of $1,2,\ldots,M-1$. In case of a full rank, wherein r=M, each of the $k_1, k_2, \ldots, k_{r-1}$ values may be respectively assigned with a value from $1,2,\ldots,M-1$. When configuring the values of $k_1, k_2, \ldots, k_{r-1}$, in order to set this value only with the values that exist within the range of the Main beam, each of $k_1, k_2, \ldots, k_{r-1}$ is selected so as to match with the range of the main beam $\alpha \leq \theta_{beam2} \leq \beta$. If only a $Nr_{max}$ number of $k_1$ values meeting with this condition (or requirement) exist, codebooks only up to Rank $Nr_{max}$ codebook are designed.

Any one of i) $\alpha$ and $\beta$ values, ii) or $\alpha$ and $P_2$ values, iii) or $\gamma$ and $\delta$ values, iv) or $\gamma$ and $P_1$ values, which determines Equations 32, 34, 41, 42, 43, and 44 may be predetermined between the transmission and the reception, and, depending upon the situation, the transmitting end may send any one set to the receiving end. (Herein, since Equation 39 is available for setting when the $\alpha$ and $\beta$ values are absent, separate signaling or feedback may not be required.) Alternatively, the receiving end may determine the i) $\alpha$ and $\beta$ values, ii) or $\gamma$ and $\delta$ values in accordance with its position (or a channel situation (or status) that is known by the receiving end itself), and, thereafter, the receiving end may perform a semi-static feedback.

Additionally, when the transmitting end signals to the receiving end or when the receiving and feeds-back to the transmitting end any one of i) $\alpha$ and $\beta$ values, ii) or $\alpha$ and $P_2$ values, iii) or $\gamma$ and $\delta$ values, iv) or $\gamma$ and $P_1$ values, both values (e.g., $\alpha$ and $\beta$) may be signaled/fed-back. However, after fixing one of the values (e.g., $\alpha$) as a value pre-arranged by the transmitting end and the receiving end, signaling/feedback may be performed on the other remaining value (e.g., $\beta$). More specifically, for example, when the transmitting end signals the values of $\alpha$ and $\beta$ to the receiving end, or when the receiving end feeds-back the values of $\alpha$ and $\beta$ to the transmitting end, in a situation when $$\alpha = \frac{\pi}{2}$$

is prearranged by the transmitting end and the receiving end, the $\beta$ value may signaled or fed-back as a value equal to or greater than the value of $$\frac{\pi}{2}.$$

More specifically, in the present invention, the transmitting end may signal any one of i) $\alpha$ and $\beta$ values, ii) or $\alpha$ and $P_2$ values, iii) or $\gamma$ and $\delta$ values, iv) or $\gamma$ and $P_1$ values to the receiving end, and, furthermore, the signaling may be notified by the transmitting end to the receiving end via RRC signaling.

Accordingly, in case the transmitting end signals any one of i) $\alpha$ and $\beta$ values, ii) or $\alpha$ and $P_2$ values, iii) or $\gamma$ and $\delta$ values, iv) or $\gamma$ and $P_1$ values to the receiving end, the present invention proposes that this may be used in combination with a CSI request field. A CSI request field is configured of 1 bit or 2 bits within the DCI. In case the field is configured of 1 bit, when '1' is received, this indicates that the CSI report is being triggered (triggering). In case the field is configured of 2 bits, for example, the CSI request field is as shown below in Table 3 and Table 4.

TABLE 3

| Value of CSI request field | Description |
|---|---|
| '00' | No aperiodic CSI report is triggered |
| '01' | Aperiodic CSI report is triggered for serving cell c |
| '10' | Aperiodic CSI report is triggered for a 1$^{st}$ set of serving cells configured by higher layers |
| '11' | Aperiodic CSI report is triggered for a 2$^{nd}$ set of serving cells configured by higher layers |

TABLE 4

| Value of CSI request field | Description |
| --- | --- |
| '00' | No aperiodic CSI report is triggered |
| '01' | Aperiodic CSI report is triggered for a set of CSI process(es) configured by higher layers for serving cell c |
| '10' | Aperiodic CSI report is triggered for a $1^{st}$ set of CSI process(es) configured by higher layers |
| '11' | Aperiodic CSI report is triggered for a $2^{nd}$ set of CSI process(es) configured by higher layers |

For users being set to Transmission mode (TMs) 1~9, the CSI request field is interpreted as Table 3, and for users being set to Transmission mode (TM) 10, the CSI request field is interpreted as Table 4.

Accordingly, the present invention proposes a combined format of a portion, wherein the transmitting end signals any one of i) α and β values, ii) or α and $P_2$ values, iii) or γ and δ values, iv) or γ and $P_1$ values to the receiving end, is combined with the CSI request field, which is described in the example presented above.

Therefore, according to the present invention, in addition to the conventional indication, a method of signaling any one of i) α and β values, ii) or α and $P_2$ values, iii) or γ and δ values, iv) or γ and $P_1$ values may be defined in Table 3 and Table 4.

For example, in case of TM 1~9, '00' still does not request for a CSI report. '01' performs an aperiodic CSI report for a serving cell, and, herein any one of i) α and β values, ii) or α and $P_2$ values, iii) or γ and δ values, iv) or γ and $P_1$ values, which limits (or restricts) the main beam, may use the fixed value as a default value. Most essentially, values may be fixed as α=90°, β=180°. As shown in FIG. 7, when the angle of θ starts from 0° along the z axis, this value indicates that the main beam is used up to 90°≤θ≤180°. Evidently, other values may also be used as the default value, and, similarly, i) α and $P_2$ values, ii) or γ and δ values, iii) or γ and $P_1$ values may also be used as pre-fixed default values.

Each of '10' and '11' performs aperiodic CSI report on serving cells, which is set-up (or configured) by a higher layer, while a limitation (or restriction) value of a beam of a main lobe is provided via RRC signaling by using any one of i) α and β values, ii) or α and $P_2$ values, iii) or γ and δ values, iv) or γ and $P_1$ values. Alternatively, among the two values, one value is used as a pre-defined value, and only the other remaining value may be processed with RRC signaling.

Additionally, in case of TM10, '00' still does not request for a CSI report. '01' performs an aperiodic CSI report for a serving cell, and, herein any one of i) α and β values, ii) or α and $P_2$ values, iii) or γ and δ values, iv) or γ and $P_1$ values, which limits (or restricts) the main beam, may use the fixed value as a default value. Most essentially, values may be fixed as α=90°, β–180°. As shown in FIG. 7, when the angle of θ starts from 0° along the z axis, this value indicates that the main beam is used up to 90°≤θ≤180°. Evidently, other values may also be used as the default value, and, similarly, i) α and $P_2$ values, ii) or γ and δ values, iii) or γ and $P_1$ values may also be used as pre-fixed default values.

Each of '10' and '11' performs aperiodic CSI report on serving cells, which is set-up (or configured) by a higher layer, while a limitation (or restriction) value of a beam of a main lobe is provided via RRC signaling by using any one of i) α and β values, ii) or α and $P_2$ values, iii) or γ and δ values, iv) or γ and $P_1$ values. Alternatively, among the two values, one value is used as a pre-defined value, and only the other remaining value may be processed with RRC signaling.

According to the above-described example, it has been described that a fixed value is being used with respect to the '01' state (regardless of the transmission mode) in association with the i) α and β values, ii) or α and $P_2$ values, iii) or γ and δ values, iv) or γ and $P_1$ values. However, in the present invention, although a subband size may be fixed in the '01' state, the fact that the subband size can be adjusted via RRC signaling shall not be excluded. For example, among the i) α and β values, ii) or α and $P_2$ values, iii) or γ and δ values, iv) or γ and $P_1$ values, some of the fixed values are collected so as to configure one group, and a value may be designated from the group via RRC signaling. Such set may be configured so that the receiving end and the transmitting end can share the set in advance before transmitting/receiving the signal.

When ΔP is limited (or restricted) in the DFT matrix codebook proposed in the present invention, although this restricted codebook may be used when the transmitting end selects a precoding vector for a vertical antenna from the receiving end, the present invention may also be used when the transmitting end sends a plurality of procoded reference signals to a reference signal. For example, the transmitting end may transmit R number of reference signals by multiplying M number of antenna ports by R number of precoding vectors having the size of M. After measuring the R number of reference signals, which are received from the transmitting end, the receiving end may be capable of knowing a precoded channel most adequate to the receiving end itself. The transmitting end may also use the codebook Equation 31, which limits (or restricts) the ΔP, from the DFT matrix codebook proposed in the present invention as the precoding vector that is used in this case. In this case, the transmitting end is not required to notify the receiving end of any separate information (α and β).

Figure 10:
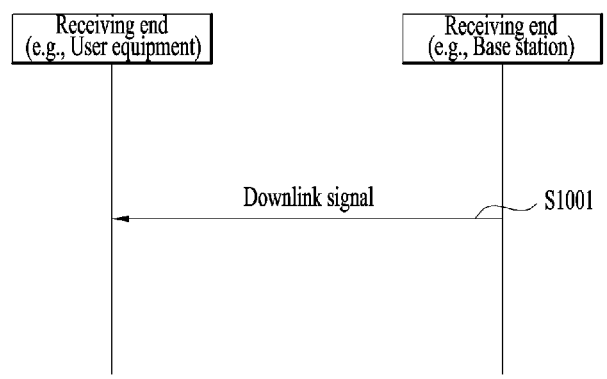
FIG. 10 illustrates a referential view of an exemplary embodiment having the present invention applied thereto.

FIG. 10 illustrates a referential view of a preferred exemplary embodiment of the present invention.

Referring to FIG. 10, the user equipment (UE) receives a downlink signal from the base station (BS) (S1001).

More specifically, in step S1001 of FIG. 10, the base station may transmit the above-described precoded signal according to the exemplary embodiment of the present invention. In S1001, information/configuration/rules and so on for allowing the base station and the user equipment to transmit/receive signals may be configured (or determined) in accordance with the description provided above according to the exemplary embodiments of the present invention. And, in some cases, these may also be decided as a combination of at least parts of the above-described exemplary embodiments.

In the method for efficiently transmitting a signal in a multi-antenna wireless communication system of the present invention, which is described above with reference to FIG. 10, the features described above in the diverse exemplary embodiments of the present invention may be independently applied or two or more exemplary embodiments may be simultaneously applied, and overlapping description will be omitted for clarity.

The above-described embodiments of the present invention correspond to predetermined combinations of elements and features and characteristics of the present invention. Moreover, unless mentioned otherwise, the characteristics of the present invention may be considered as optional features of the present invention. Herein, each element or characteristic of the present invention may also be operated or performed without being combined with other elements or characteristics of the present invention. Alternatively, the embodiment of the present invention may be realized by combining some of the elements and/or characteristics of the present invention. Additionally, the order of operations described according to the embodiment of the present invention may be varied. Furthermore, part of the configuration or characteristics of any one specific embodiment of the present invention may also be included in (or shared by) another embodiment of the present invention, or part of the configuration or characteristics of any one embodiment of the present invention may replace the respective configuration or characteristics of another embodiment of the present invention. Furthermore, it is apparent that claims that do not have any explicit citations within the scope of the claims of the present invention may either be combined to configure another embodiment of the present invention, or new claims may be added during the amendment of the present invention after the filing for the patent application of the present invention.

In this document, particular operations of the present invention that are described as being performed by the base station may also be performed by an upper node of the base station. More specifically, in a network consisting of multiple network nodes including the base station, it is apparent that diverse operations that are performed in order to communicate with the terminal may be performed by the base station or b network nodes other than the base station. The term base station may be replaced by other terms, such as fixed station, Node B, eNode B (eNB), Access Point (AP), and so on.

The above-described embodiments of the present invention may be implemented by using a variety of methods. For example, the embodiments of the present invention may be implemented in the form of hardware, firmware, or software, or in a combination of hardware, firmware, and/or software. In case of implementing the embodiments of the present invention in the form of hardware, the method according to the embodiments of the present invention may be implemented by using at least one of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, micro controllers, micro processors, and so on.

In case of implementing the embodiments of the present invention in the form of firmware or software, the method according to the embodiments of the present invention may be implemented in the form of a module, procedure, or function performing the above-described functions or operations. A software code may be stored in a memory unit and driven by a processor.

The memory may be located inside or outside of the processor, and the memory unit may transmit and receive data to and from the processor by using a wide range of methods that have already been disclosed.

The present invention may be realized in another concrete configuration (or formation) without deviating from the scope and spirit of the essential characteristics of the present invention. Therefore, in all aspect, the detailed description of present invention is intended to be understood and interpreted as an exemplary embodiment of the present invention without limitation. The scope of the present invention shall be decided based upon a reasonable interpretation of the appended claims of the present invention and shall come within the scope of the appended claims and their equivalents. Therefore, it is intended that the present invention covers the modifications and variations of this invention provided they come within the scope of the appended claims and their equivalents, and it is not intended to limit the present invention only to the examples presented herein.

INDUSTRIAL APPLICABILITY

Although the above-described method for efficiently transmitting a signal in a multi-antenna wireless communication system and apparatus for the same are described based upon an example being applied to the 3GPP LTE system, the present invention may also be applied to various wireless communication systems, in addition to the 3GPP LTE system, by using the same method.

What is claimed is:

1. A method transmitting a signal by a transmitting end in a wireless communication system supporting a multi-antenna, the method comprising:
   transmitting a downlink signal based on a precoding matrix (W) for an antenna comprising a plurality of antenna elements aligned perpendicularly,
   wherein the precoding matrix (W) corresponds to a codebook configured so that phase increase is limited with respect to a plurality of precoding vector values populating a same column,
   wherein the codebook is defined as shown below in Equation A, $$D_{(mn)}^{M \times Ma} = \frac{1}{\sqrt{M}} \exp\left(j\left(\gamma(m-1) + \frac{(\delta-\gamma)(m-1)(n-1)}{Ma}\right)\right), \quad \text{[Equation A]}$$

wherein m=1,2, ..., M, n=1,2, ..., M·a, and
   wherein $D_{(mn)}^{M \times Ma}$ represents elements of (m, n) in a DFT matrix configuring the codebook,
   wherein M signifies a number of the plurality of antenna elements, and wherein $\alpha$ signifies an oversampling factor,
   wherein $\gamma$ represents a lowermost value in a range of the elevation angle, and
   wherein $\delta$ represents an upper limit value in a range of the elevation angle.

2. The method of claim 1, wherein the phase increase is configured based upon an elevation angle ($\theta_{beam}$) between the plurality of antenna elements and a receiving end.

3. The method of claim 1, wherein a difference between the lowermost value in the range of the elevation angle and the upper limit value in the range of the elevation angle ($\delta-\gamma$) is less than $2\pi$.

4. The method of claim , wherein the elevation angle is defined as shown below in Equation B, $$\gamma + \frac{(\delta-\gamma)(i-1)}{2^L}, \quad \text{[Equation B]}$$

wherein $\gamma$ represents a lowermost value in a range of the elevation angle, wherein $\delta$ represents a upper limit value in a range of the elevation angle, wherein, and wherein indicates a bit value assigned to the elevation angle ($\theta_{beam}$).

5. The method of claim 1, wherein the phase increase is configured to allow a coverage of a beam generated in accordance with the codebook to become even.

6. The method of claim 1, wherein information on the phase increase is indicated by a Channel State Information request field (CSI Request field) within downlink control information.

7. The method of claim 6, wherein the Channel State Information request field is differently interpreted with respect to a Transmission mode.

8. The method of claim 6, wherein the phase increase is selected from a predetermined candidate group with respect to a value indicated by the Channel State Information request field.

9. A base station transmitting a signal in a wireless communication system supporting a multi-antenna, the base station comprises:
a Radio Frequency Unit (RF Unit); and
a Processor,
wherein the Processor is configured to transmit a downlink signal based on a precoding matrix (W) for an antenna comprising a plurality of antenna elements aligned perpendicularly,
wherein the precoding matrix (W) corresponds to a codebook configured so that phase increase is limited with respect to a plurality of precoding vector values populating a same column,
wherein the codebook is defined as shown below in Equation A, $$D_{(mn)}^{M \times Ma} = \frac{1}{\sqrt{M}} \exp\left( j\left( \gamma(m-1) + \frac{(\delta - \gamma)(m-1)(n-1)}{Ma} \right) \right),$$ [Equation A]

wherein m=1,2, ..., M, n=1,2, ..., M·a, and
wherein $D_{(mn)}^{M \times Ma}$ represents elements of (m, n) in a DFT matrix configuring the codebook,
wherein M signifies a number of the plurality of antenna elements, and wherein α signifies an oversampling factor,
wherein γ represents a lowermost value in a range of the elevation angle, and
wherein δ represents an upper limit value in a range of the elevation angle.

* * * * *